US008216845B2

(12) United States Patent
Ajiro et al.

(10) Patent No.: US 8,216,845 B2
(45) **Date of Patent: *Jul. 10, 2012**

(54) GAMING SYSTEM HAVING A PLURALITY OF GAMING MACHINES LINKED BY NETWORK AND CONTROL METHOD THEREOF

(75) Inventors: Arata Ajiro, Tokyo (JP); Yoichi Kato, Tokyo (JP); Kenta Sugano, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 438 days.

This patent is subject to a terminal disclaimer.

(21) Appl. No.: 12/415,404

(22) Filed: Mar. 31, 2009

(65) Prior Publication Data

US 2009/0264185 A1 Oct. 22, 2009

Related U.S. Application Data

(60) Provisional application No. 61/046,551, filed on Apr. 21, 2008.

(51) Int. Cl.
*A63F 13/00* (2006.01)
*A63F 13/10* (2006.01)

(52) U.S. Cl. ................. 436/27; 463/20; 463/26; 463/59

(58) Field of Classification Search .................... 463/20, 463/26, 42, 27, 59
See application file for complete search history.

(56) References Cited

U.S. PATENT DOCUMENTS 6,068,553 A 5/2000 Parker
6,146,273 A * 11/2000 Olsen .............................. 463/27
6,210,275 B1 4/2001 Olsen
6,224,484 B1 5/2001 Okuda et al.
6,358,149 B1 * 3/2002 Schneider et al. .............. 463/27
6,375,569 B1 * 4/2002 Acres .............................. 463/27
6,682,418 B1 * 1/2004 Mendes et al. ..................... 463/6
6,702,670 B2 * 3/2004 Jasper et al. ..................... 463/20
2002/0155879 A1 * 10/2002 Walker et al. .................. 463/20
2003/0104868 A1 * 6/2003 Okita et al. ..................... 463/42
2003/0236110 A1 12/2003 Beaulieu et al.
2005/0079911 A1 4/2005 Nakatsu
2005/0090307 A1 * 4/2005 Walker et al. .................. 463/20
2005/0119044 A1 6/2005 Lim et al.
2005/0187014 A1 8/2005 Saffari et al.
2006/0035696 A1 * 2/2006 Walker et al. .................. 463/16

(Continued)

OTHER PUBLICATIONS

Schmoyer, Jeff "You Light Up My Micro", Jan./Feb. 1998, MicroComputer Journal, from the www.archive.org web page downloaded from http://web.archive.org/web/20011124124942/http://melabs.com/resources/articles/ledart.htm with an archive.org date of Nov. 24, 2001 (downloaded on Aug. 28, 2011).*

*Primary Examiner* — Peter DungBa Vo
*Assistant Examiner* — Nicholas Ditoro
(74) *Attorney, Agent, or Firm* — Lexyoume IP Meister, PLLC.

(57) ABSTRACT

A gaming system of the present invention comprising a plurality of gaming machines each including a controller and a control device including a processor, wherein the processor is programmed to execute the processing of (A) cumulatively counting a part of a number of betted game media as a cumulative value based on number-of-game-media information received from the gaming machine, and (B) transmitting a common-game execution signal to the gaming machine, when the cumulative value has reached a predetermined value.

21 Claims, 23 Drawing Sheets

U.S. PATENT DOCUMENTS

| | | | | |
|---|---|---|---|---|
| 2006/0073897 | A1 | 4/2006 | Englman et al. | |
| 2006/0079310 | A1 * | 4/2006 | Friedman et al. | 463/16 |
| 2006/0205468 | A1 | 9/2006 | Saffari et al. | |
| 2006/0287043 | A1 | 12/2006 | Englman et al. | |
| 2007/0087824 | A1 | 4/2007 | Ogiwara | |
| 2007/0167217 | A1 | 7/2007 | Kaminkow et al. | |
| 2009/0011827 | A1 * | 1/2009 | Englman et al. | 463/27 |
| 2009/0124332 | A1 * | 5/2009 | Baerlocher | 463/20 |

* cited by examiner

Fig. 9

| Normal symbol | Number of rearranged symbols | | | |
|---|---|---|---|---|
| | 3 symbols | 4 symbols | 5 symbols | 6 or more symbols |
| RIBBON | 2 | 4 | 6 | m × (n−2) (※) |
| HEART | 3 | 6 | 9 | |
| STAR | 5 | 10 | 15 | |
| MOON | 8 | 16 | 24 | |
| SUN | 10 | 20 | 30 | |
| JEWEL | 15 | 30 | 45 | |
| CROWN | 20 | 40 | 60 | |
| SMILE | 30 | 60 | 90 | |

※"m" represents the amount of payout when 3 symbols are rearranged.
"n" represents the number of rearranged symbols.

Fig. 14

| Common-game symbol | Number of rearranged symbols | | | |
|---|---|---|---|---|
| | 2 symbols | 3 symbols | 4 symbols | 5 or more symbols |
| 10 | 1 | 2 | 3 | m× (n−1) (※1) |
| J | 2 | 4 | 6 | |
| Q | 3 | 6 | 9 | |
| K | 5 | 10 | 15 | |
| A | 10 | 20 | 30 | |

※1 "m" represents the number of points when 2 symbols are rearranged.
"n" represents the number of rearranged symbols.

Fig. 15A

| Number-of-lighting determination table for bent portions | | | | | | | |
|---|---|---|---|---|---|---|---|
| Number of points | Slot machine | | | | | | |
| | A | B | C | · | · | I | J |
| 1～5 | 5 | 8 | 10 | · | · | 8 | 5 |
| 6～10 | 10 | 16 | 20 | · | · | 16 | 10 |
| 11～15 | 15 | 24 | 30 | · | · | 24 | 15 |
| 16～20 | 20 | 32 | 40 | · | · | 32 | 20 |
| 21～25 | 25 | 40 | 50 | · | · | 40 | 25 |
| 30～ | 50 | 80 | 100 | · | · | 80 | 50 |

Fig. 15B

| Number of lighting determination table for straight portions | | | | | | | |
|---|---|---|---|---|---|---|---|
| Number of points | Slot machine | | | | | | |
| | A | B | C | · | · | I | J |
| 1～5 | 5 | 5 | 5 | · | · | 5 | 5 |
| 6～10 | 10 | 10 | 10 | · | · | 10 | 10 |
| 11～15 | 15 | 15 | 15 | · | · | 15 | 15 |
| 16～20 | 20 | 20 | 20 | · | · | 20 | 20 |
| 21～25 | 25 | 25 | 25 | · | · | 25 | 25 |
| 30～ | 50 | 50 | 50 | · | · | 50 | 50 |

Fig. 17A

| Number-of-lighting determination table for bent portions | | | | | | | |
|---|---|---|---|---|---|---|---|
| Number of accumulated points | Slot machine | | | | | | |
| | A | B | C | · | · | I | J |
| 5 | 5 | 8 | 10 | · | · | 8 | 5 |
| 10 | 5 | 8 | 10 | · | · | 8 | 5 |
| 15 | 5 | 8 | 10 | · | · | 8 | 5 |
| · | · | · | · | · | · | · | · |
| · | · | · | · | · | · | · | · |
| 90 | 5 | 8 | 10 | · | · | 8 | 5 |
| 95 | 5 | 8 | 10 | · | · | 8 | 5 |
| 100 | 5 | 8 | 10 | · | · | 8 | 5 |

Fig. 17B

| Number-of-lighting determination table for straight portions | | | | | | | |
|---|---|---|---|---|---|---|---|
| Number of accumulated points | Slot machine | | | | | | |
| | A | B | C | · | · | I | J |
| 105 | 5 | 5 | 5 | · | · | 5 | 5 |
| 110 | 5 | 5 | 5 | · | · | 5 | 5 |
| 115 | 5 | 5 | 5 | · | · | 5 | 5 |
| · | · | · | · | · | · | · | · |
| · | · | · | · | · | · | · | · |
| 140 | 5 | 5 | 5 | · | · | 5 | 5 |
| 145 | 5 | 5 | 5 | · | · | 5 | 5 |
| 150 | 5 | 5 | 5 | · | · | 5 | 5 |

Fig. 18A

| List of payout when number of bet is 1 | |
|---|---|
| Combination of symbols | Number of payouts |
| 3bar-3bar-3bar | 60 |
| 2bar-2bar-2bar | 40 |
| 1bar-1bar-1bar | 20 |
| anybar-anybar-anybar | 10 |

Fig. 18B

| List of payout when number of bet is 2 | |
|---|---|
| Combination of symbols | Number of payouts |
| 3bar-3bar-3bar | 120 |
| 2bar-2bar-2bar | 80 |
| 1bar-1bar-1bar | 40 |
| anybar-anybar-anybar | 20 |

Fig. 18C

| List of payout when number of bet is 3 | |
|---|---|
| Combination of symbols | Number of payouts |
| blue 7-blue 7-blue 7 | 1800 |
| red 7-red 7-red 7 | 100 |
| white 7-white 7-white 7 | 100 |

Fig. 21

| Symbol | Number of points |
| --- | --- |
| blue7-blue7-blue7 | 7000 |
| blue7 | 300 |
| red7 | 150 |
| 3bar | 30 |
| 2bar | 20 |
| 1bar | 10 |

GAMING SYSTEM HAVING A PLURALITY OF GAMING MACHINES LINKED BY NETWORK AND CONTROL METHOD THEREOF

CROSS-REFERENCE TO RELATED APPLICATIONS

This application claims benefit of priority based on U.S. Provisional Patent Application No. 61/046,551 filed on Apr. 21, 2008. The contents of this application are incorporated herein by reference in their entirety.

BACKGROUND OF THE INVENTION

1. Field of the Invention

The present invention relates to a gaming system having a plurality of gaming machines linked by a network and a control method thereof.

2. Discussion of the Background

Conventionally, there exists a gaming system having a plurality of gaming machines linked by network as disclosed in: U.S. Pat. Nos. 6,068,553, 6,210,275, 6,224,484, US 2003/0236110-A1, US 2005/0079911-A1, US 2005/0119044-A1, US 2006/0205468-A1, US 2005/0187014-A1, US 2006/0287043-A1, US 2006/0073897-A1, US 2007/0087824-A1, US 2007/0167217-A1. in this kind of a gaming system, a game medium inserted into each gaming machine is pooled in one place and the pooled game media are paid out to the gaming machine having won a progressive jackpot.

A player playing a game in the aforementioned gaming system is playing the game for the sake of acquiring pooled game media. However, gaming systems as described above are monotonous, since payout of pooled game media is conducted to a gaming machine, for example, determined through a lottery, and the method itself for paying out the pooled game media lacks an interesting aspect. Therefore, there has been a problem that the player easily gets tired of the game.

The present invention was made in view of the aforementioned problem and an object thereof is to provide a gaming system that the player hardly gets tired of the game and a control method thereof.

The contents of U.S. Pat. Nos. 6,068,553, 6,210,275, 6,224,484, US 2003/0236110-A1, US 2005/0079911-A1, US 2005/0119044-A1, US 2006/0205468-A1, US 2005/0187014-A1, US 2006/0287043-A1, US 2006/0073897-A1, US 2007/0087824-A1, US 2007/0167217-A1 are incorporated herein by reference in their entirety.

SUMMARY OF THE INVENTION

The present invention provides a gaming system having the following configuration.

Namely, the gaming system comprises: a plurality of gaming machines each including a controller; a control device including a processor; a network enabling communication between the plurality of gaming machines and the control device; a reach portion indicative of a target position to reach; and a coupling illuminated line provided for each of the gaming machines and including a plurality of illuminants arranged from the reach portion to the gaming machine, wherein the controller is programmed to execute processing of (a) accepting a bet of a game medium, and (b) transmitting number-of-game-media information indicative of a number of betted game media as the bet accepted in the processing (a) to the control device, the processor is programmed to execute processing of (A) cumulatively counting a part of the number of betted game media as a cumulative value based on the number-of-game-media information received from the gaming machine, and (B) transmitting a common-game execution signal to the gaming machine, when the cumulative value has reached a predetermined value, the controller is further programmed to execute processing of (c) executing a common game without accepting the bet of the game medium in the processing (a), after receiving the common-game execution signal from the control device, and (d) transmitting common-game result information determined based on a result of the common game executed in the processing (c) to the control device, and the processor is further programmed to execute processing of (C) lighting the plurality of illuminants included in the coupling illuminated line provided for the gaming machine as a transmission source of the common-game result information, based on the common-game result information transmitted in the processing (d), in an order starting from the illuminant provided at a position closest to the gaming machine, (D) determining whether or not the coupling illuminated line with all of the illuminants having been lighted in the processing (C) is present, and (E) paying out a predetermined number of game media, when determining that the coupling illuminated line with all of the illuminants having been lighted is present in the processing (D), to the gaming machine provided with the coupling illuminated line.

According to the above gaming system, the control device cumulatively counts a part of the number of game media betted in each of the gaming machines as a cumulative value. Further, when the cumulative value reaches a predetermined value, a common game is executed in the gaming machine. When the common game is executed, the control device lights the illuminants included in the coupling illuminated line provided for each of the gaming machines based on a result of the common game and pays out a predetermined number of game media to the gaming machine provided with the coupling illuminated line with all the illuminants included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the illuminants included in the coupling illuminated line provided for each of the gaming machines. This can cause the player to play the common game while having a sense of expectation. Further, payout of the predetermined number of game media is conducted when all the illuminants included in the coupling illuminated line have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

It is desirable that the gaming system further has the following configuration.

Namely, the gaming system comprises: a plurality of slot machines each including a symbol display capable of variably displaying a symbol and a controller; a control device including a processor; a network enabling communication between the plurality of slot machines and the control device; a reach portion indicative of a target position to reach; and a coupling illuminated line provided for each of the slot machines and including a plurality of illuminants arranged from the reach portion to the slot machine, wherein the controller is programmed to execute processing of (a) accepting a bet of a game medium, and (b) transmitting number-of-game-media information indicative of a number of betted game media as the bet accepted in the processing (a) to the control device, the processor is programmed to execute processing of (A) cumulatively counting a part of the number of betted game media as a cumulative value based on the number-of-game-media information received from the slot machine, and (B) transmitting a common-game execution signal to the slot machine, when the cumulative value has reached a predetermined value, the controller is further programmed to execute processing of (c) repeatedly executing processing of variably displaying the symbol and stop-displaying the symbol to the symbol display, without accepting the bet of the game medium in the processing (a), after receiving the common-game execution signal transmitted from the control device, and the processor is further programmed to execute processing of (C) determining a number of points to be offered to each of the slot machines based on a number or a combination of the symbol stop-displayed to the symbol display in each of the slot machines after executing the processing (B), (D) lighting the plurality of illuminants included in the coupling illuminated line provided for the slot machine based on the number of points determined in the processing (C), the number of points being to be offered to the slot machine, in an order starting from the illuminant provided at a position closest to the slot machine, (E) determining whether or not the coupling illuminated line with all of the illuminants having been lighted in the processing (D) is present, and (F) paying out a predetermined number of game media, when determining that the coupling illuminated line with all of the illuminants having been lighted is present in the processing (E), to the slot machine provided with the coupling illuminated line.

According to the above gaming system, the control device cumulatively counts a part of the number of game media betted in each of the slot machines as a cumulative value. Further, when the cumulative value reaches a predetermined value, a common game is executed in the slot machine. In the common game, the slot machine repeatedly executes the processing of variably displaying the symbol and stop-displaying the symbol to the symbol display, without accepting the bet of the game media. Upon execution of the common game, the control device determines the number of points to be offered to each slot machine based on the number or the combination of symbols stop-displayed to the symbol display, and lights the illuminant included in the coupling illuminated line provided for each slot machine based on the determined number of points. Then, the control device pays out the predetermined number of game media to the slot machine provided with the coupling illuminated line with all the illuminants included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the illuminants included in the coupling illuminated line provided for each of the slot machines. This can cause the player to play the common game while having a sense of expectation. Further, payout of the predetermined number of game media is conducted when all the illuminants included in the coupling illuminated line have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

It is desirable that the gaming system further has the following configuration.

Namely, the controller is further programmed to execute processing of (c-1) transmitting specific-state information at least indicative of a type of a specific state, when the number or the combination of the symbol stop-displayed to the symbol display is in the specific state out of a plurality of specific states, and the processing (C) executed by the processor is a processing of determining the number of points based on the specific-state information received from each of the slot machines, the number of points being varied in accordance with a type of the specific state indicated by the specific-state information.

According to the gaming system, in the case that the number or the combination of the symbols stop-displayed to the symbol display is in the specific state out of a plurality of specific states, the number of points which varies in accordance with a type of the specific state is offered. Namely, since the number of points to be offered is different in accordance with the number or the combination of the symbols stop-displayed to the symbol display, an interesting aspect of the game is broadened. Consequently, it is possible to have the player play the game while being entertained.

It is desirable that the gaming system further has the following configuration.

Namely, the number of the symbols is equal to or more than 1.

It is a target of offering of the points even the number of symbols is one. Accordingly, an occasion of the offering of the points is increased, thereby having the player excited and absorbed more in the game.

The present invention provides a gaming system having the following configuration.

Namely, the gaming system comprises: a plurality of slot machines each including a symbol display capable of variably displaying a symbol and a controller; a control device including a processor; a network enabling communication between the plurality of slot machines and the control device; a reach portion indicative of a target position to reach; and a coupling illuminated line provided for each of the slot machines and including a plurality of illuminants arranged from the reach portion to the slot machine, wherein the controller is programmed to execute processing of (a) accepting a bet of a game medium, and (b) transmitting number-of-game-media information indicative of a number of betted game media as the bet accepted in the processing (a) to the control device, the processor is programmed to execute processing of (A) cumulatively counting a part of the number of betted game media as a cumulative value based on the number-of-game-media information received from the slot machine, and (B) transmitting a common-game execution signal to the slot machine, when the cumulative value has reached a predetermined value, the controller is further programmed to execute processing of (c) repeatedly executing processing of variably displaying the symbol and stop-displaying the symbol to the symbol display, without accepting the bet of the game medium in the processing (a), after receiving the common-game execution signal from the control device, and the processor is further programmed to execute processing of (C) determining a number of points to be offered to each of the slot machines based on a number or a combination of the symbol stop-displayed to the symbol display in each of the slot machines after executing the processing (B), (D) cumulatively counting the number of points determined in the processing (C) for each slot machine as a number of accumulated points, (E) lighting a plurality of illuminants included in the coupling illuminated line provided for the slot machine based on the number of accumulated points counted in the processing (D), the slot machine being associated with the number of accumulated points, in an order starting from the illuminant provided at a position closest to the slot machine, (F) determining whether or not the coupling illuminated line with all of the illuminants having been lighted in the processing (E) is present, and (G) paying out a predetermined number of game media, when determining that the coupling illuminated line with all of the illuminants having been lighted is present in the processing (F), to the slot machine provided with the coupling illuminated line.

According to the above gaming system, the control device cumulatively counts a part of the number of game media betted in each of the slot machines as a cumulative value. Further, when the cumulative value reaches a predetermined value, a common game is executed in the slot machine. In the common game, the slot machine repeatedly executes the processing of variably displaying the symbol and stop-displaying the symbol to the symbol display, without accepting the bet of the game media. Upon execution of the common game, the control device determines the number of points to be offered to each slot machine based on the number or the combination of symbols stop-displayed to the symbol display, and counts the number of points cumulatively as a number of accumulated points. The control device lights the illuminant included in the coupling illuminated line provided for each slot machine based on the counted number of accumulated points. Then, the control device pays out the predetermined number of game media to the slot machine provided with the coupling illuminated line with all the illuminants included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the illuminants included in the coupling illuminated line provided for each of the slot machines. This can cause the player to play the common game while having a sense of expectation. Further, payout of the predetermined number of game media is conducted when all the illuminants included in the coupling illuminated line have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

It is desirable that the gaming system further has the following configuration.

Namely, the number of the symbols is equal to or more than 1.

It is a target of offering of the points even the number of symbols is one. Accordingly, an occasion of the offering of the points is increased, thereby having the player excited and absorbed more in the game.

The present invention further provides a game control method having the following configuration.

Namely, the game control method comprises steps of: (a) accepting a bet of a game medium in a gaming machine; (b) transmitting number-of-game-media information indicative of a number of betted game media as the bet accepted in the step (a) to a control device from the gaming machine; (A) cumulatively counting a part of the number of betted game media in the control device as a cumulative value based on the number-of-game-media information received from the slot machine; (B) transmitting a common-game execution signal to the gaming machine from the control device, when the cumulative value has reached a predetermined value; (c) executing a common game in the gaming machine without accepting the bet of the game medium in the step (a) after receiving the common-game execution signal transmitted from the control device; (d) transmitting common-game result information determined based on a result of the common game executed in the step (c) to the control device from the gaming machine; (C) lighting by using the control device a plurality of illuminants included in a coupling illuminated line provided for the gamine machine as a transmission source of the common-game result information based on the common-game result information transmitted in the step (d), in an order starting from the illuminant provided at a position closest to the gaming machine, the coupling illuminated line being provided for each of the gaming machines and including the plurality of illuminants arranged from a reach portion indicative of a target position to reach to the gaming machine; (D) determining in the control device whether or not the coupling illuminated line with all of the illuminants having been lighted in the step (C) is present; and (E) paying out a predetermined number of game media, when determining that the coupling illuminated line with all of the illuminants having been lighted is present in the step (D), from the control device to the gaming machine provided with the coupling illuminated line.

According to the above game control method, the control device cumulatively counts a part of the number of game media betted in each of the gaming machines as a cumulative value. Further, when the cumulative value reaches a predetermined value, a common game is executed in the gaming machine. When the common game is executed, the control device lights the illuminants included in the coupling illuminated line provided for each of the gaming machines based on a result of the common game and pays out a predetermined number of game media to the gaming machine provided with the coupling illuminated line with all the illuminants included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the illuminants included in the coupling illuminated line provided for each of the gaming machines. This can cause the player to play the common game while having a sense of expectation. Further, payout of the predetermined number of game media is conducted when all the illuminants included in the coupling illuminated line have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

The present invention further provides a game control method having the following configuration.

Namely, the game control method comprises steps of: (a) accepting a bet of a game medium in a slot machine; (b) transmitting number-of-game-media information indicative of a number of betted game media as the bet accepted in the step (a) to a control device from the slot machine; (A) cumulatively counting in the control device a part of the number of betted game media as a cumulative value based on the number-of-game-media information received from the slot machine; (B) transmitting a common-game execution signal to the slot machine from the control device, when the cumulative value has reached a predetermined value; (c) repeatedly executing processing of variably displaying a symbol and stop-displaying the symbol to a symbol display capable of variably displaying the symbol in the slot machine, without accepting the bet of the game medium in the step (a), after receiving the common-game execution signal transmitted from the control device; (C) determining a number of points to be offered to each of the slot machines by using the control device based on a number or a combination of the symbol stop-displayed to the symbol display in each of the slot machines after executing the step (B); (D) lighting by using the control device a plurality of illuminants included in a coupling illuminated line provided for the slot machine based on the number of points determined in the step (C), the number of points being to be offered to the slot machine, in an order starting from the illuminant provided at a position closest to the slot machine, the coupling illuminated line being provided for each of the slot machines and including the plurality of illuminants arranged from the reach portion to the slot machine; (E) determining in the control device whether or not the coupling illuminated line with all of the illuminants having been lighted in the step (D) is present, and (F) paying out a predetermined number of game media, when determining that the coupling illuminated line with all of the illuminants having been lighted is present in the step (E), from the control device to the slot machine provided with the coupling illuminated line.

According to the above game control method, the control device cumulatively counts a part of the number of game media betted in each of the slot machines as a cumulative value. Further, when the cumulative value reaches a predetermined value, a common game is executed in the slot machine. In the common game, the slot machine repeatedly executes the processing of variably displaying the symbol and stop-displaying the symbol to the symbol display, without accepting the bet of the game media. Upon execution of the common game, the control device determines the number of points to be offered to each slot machine based on the number or the combination of symbols stop-displayed to the symbol display, and lights the illuminant included in the coupling illuminated line provided for each slot machine based on the determined number of points. Then, the control device pays out the predetermined number of game media to the slot machine provided with the coupling illuminated line with all the illuminants included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the illuminants included in the coupling illuminated line provided for each of the slot machines. This can cause the player to play the common game while having a sense of expectation. Further, payout of the predetermined number of game media is conducted when all the illuminants included in the coupling illuminated line have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

The present invention further provides a game control method having the following configuration.

Namely, the game control method comprises steps of: (a) accepting a bet of a game medium in a slot machine; (b) transmitting number-of-game-media information indicative of a number of betted game media as the bet accepted in the step (a) to a control device from the slot machine; (A) cumulatively counting in the control device a part of the number of betted game media as a cumulative value based on the number-of-game-media information received from the slot machine; (B) transmitting a common-game execution signal to the slot machine from the control device, when the cumulative value has reached a predetermined value; (c) repeatedly executing processing of variably displaying a symbol and stop-displaying the symbol to a symbol display capable of variably displaying the symbol in the slot machine, without accepting the bet of the game medium in the step (a), after receiving the common-game execution signal transmitted from the control device; (C) determining a number of points to be offered to each of the slot machines by using the control device based on a number or a combination of the symbol stop-displayed to the symbol display in each of the slot machines after executing the step (B); (D) cumulatively counting in the control device the number of points determined in the step (C) for each slot machine as a number of accumulated points; (E) lighting by using the control device a plurality of illuminants included in a coupling illuminated line provided for the slot machine based on the number of accumulated points counted in the step (D), the slot machine being associated with the number of accumulated points, in an order starting from the illuminant provided at a position closest to the slot machine, the coupling illuminated line being provided for each of the slot machines and including the plurality of illuminants arranged from a reach portion indicative of a target position to reach to the slot machine; (F) determining in the control device whether or not the coupling illuminated line with all of the illuminants having been lighted in the step (E) is present; and (G) paying out a predetermined number of game media, when determining that the coupling illuminated line with all of the illuminants having been lighted is present in the step (F), from the control device to the slot machine provided with the coupling illuminated line.

According to the above game control method, the control device cumulatively counts a part of the number of game media betted in each of the slot machines as a cumulative value. Further, when the cumulative value reaches a predetermined value, a common game is executed in the slot machine. In the common game, the slot machine repeatedly executes the processing of variably displaying the symbol and stop-displaying the symbol to the symbol display, without accepting the bet of the game media. Upon execution of the common game, the control device determines the number of points to be offered to each slot machine based on the number or the combination of symbols stop-displayed to the symbol display, and counts the number of points cumulatively as a number of accumulated points. The control device lights the illuminant included in the coupling illuminated line provided for each slot machine based on the counted number of accumulated points. Then, the control device pays out the predetermined number of game media to the slot machine provided with the coupling illuminated line with all the illuminants included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the illuminants included in the coupling illuminated line provided for each of the slot machines. This can cause the player to play the common game while having a sense of expectation. Further, payout of the predetermined number of game media is conducted when all the illuminants included in the coupling illuminated line have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

BRIEF DESCRIPTION OF THE DRAWINGS

FIG. 9 is a view illustrating correspondence relationship among a type and a number of rearranged normal symbols and an amount of payouts.

FIG. 14 is a view illustrating a number-of-points determination table.

FIG. 15A is a view illustrating a number-of-lighting determination table.

FIG. 15B is a view illustrating a number-of-lighting determination table.

FIG. 17A is a view illustrating a number-of-lighting determination table.

FIG. 17B is a view illustrating a number-of-lighting determination table.

FIG. 18A is a view illustrating a relationship between a combination of symbols rearranged on a winning line and a number of coin-outs in a normal game according to another embodiment.

FIG. 18B is a view illustrating a relationship between a combination of symbols rearranged on a winning line and a number of coin-outs in the normal game according to another embodiment.

FIG. 18C is a view illustrating a relationship between a combination of symbols rearranged on a winning line and a number of coin-outs in the normal game according to another embodiment.

FIG. 21 is a view illustrating a number-of-points determination table according to another embodiment.

DESCRIPTION OF THE EMBODIMENTS

An embodiment of the present invention is described based on the drawings.

At first, with reference to FIG. 1 and FIGS. 2A to 2B, there will be given a general description of the present embodiment.

Figure 1:
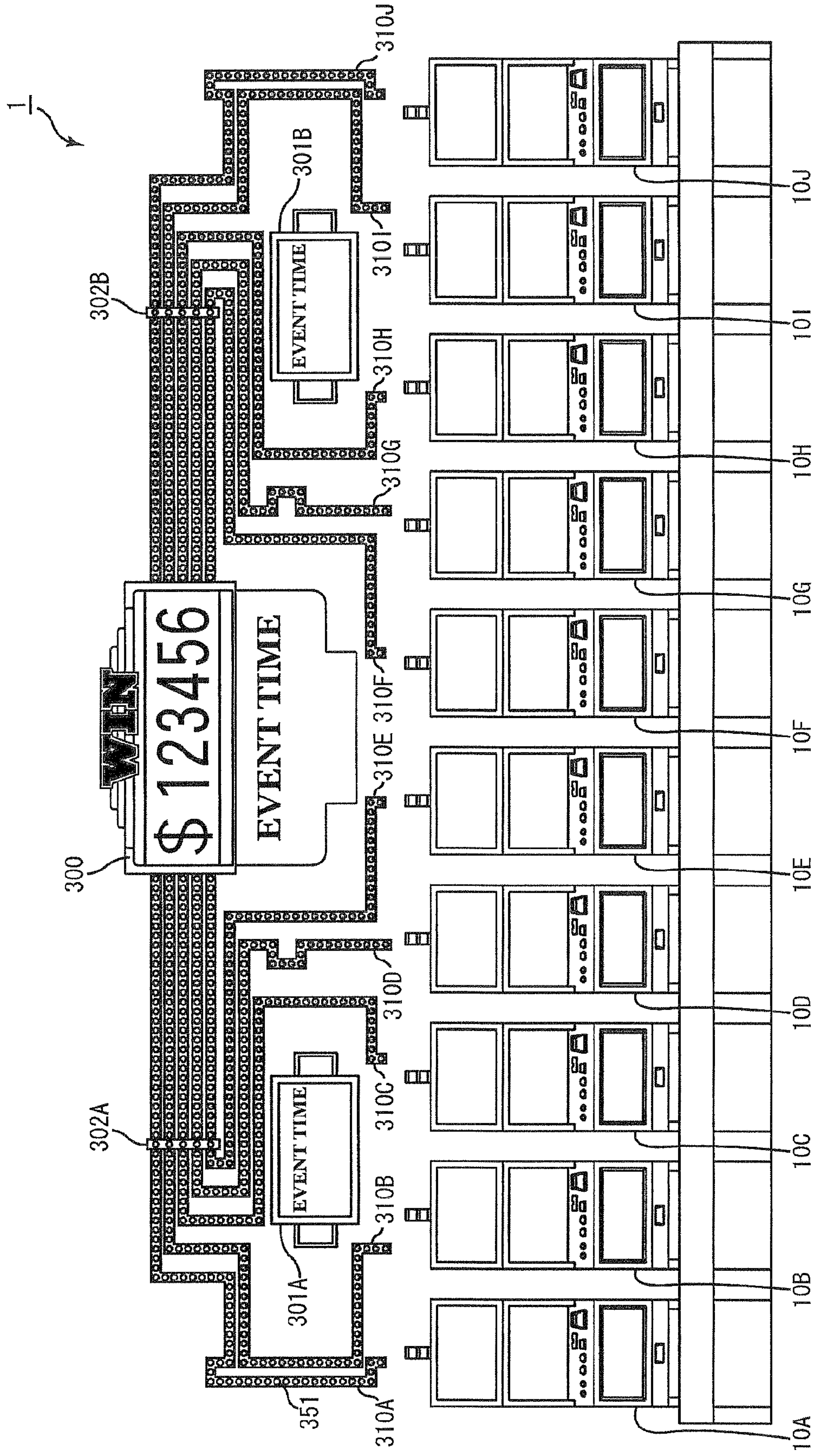
FIG. 1 is a front view schematically illustrating a gaming system according to one embodiment of a present invention.

FIG. 1 is a front view schematically illustrating a gaming system according to an embodiment of the present invention.

Figure 2A:
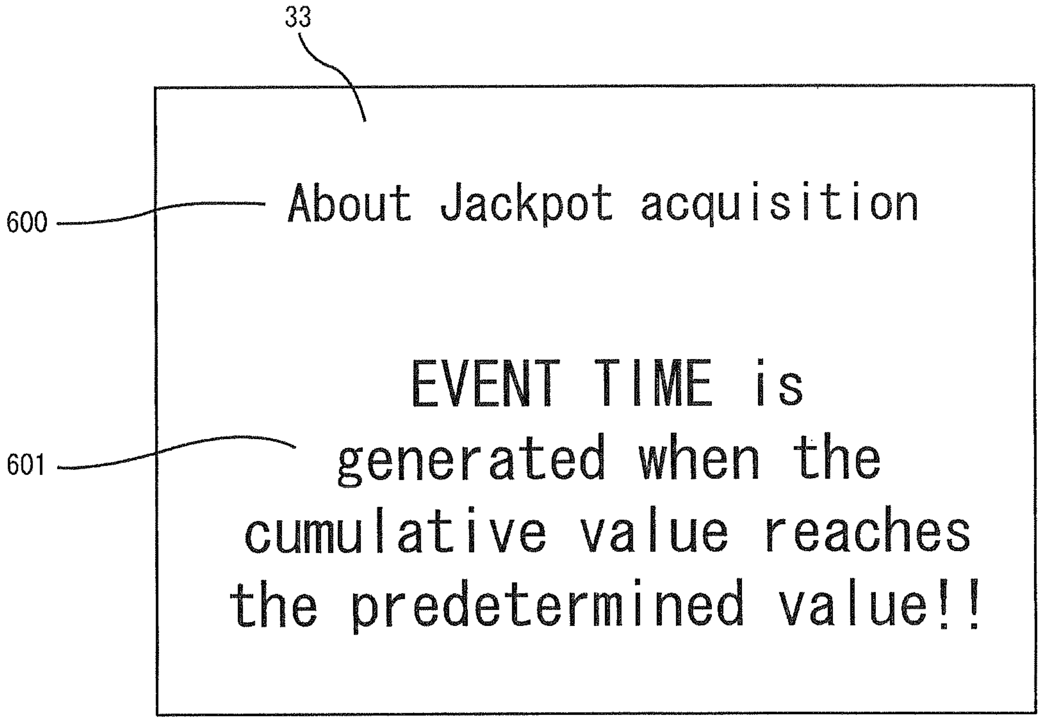
FIG. 2A is a view illustrating an exemplary image displayed to an upper image display panel included in a slot machine forming a gaming system according to one embodiment of the present invention.
Figure 2B:
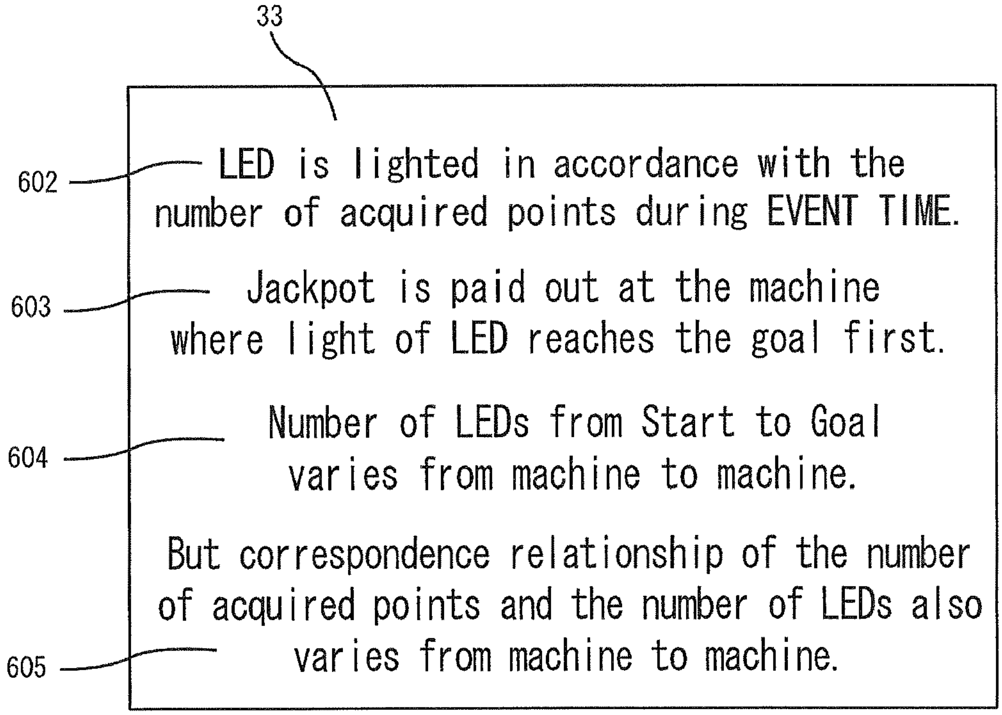
FIG. 2B is a view illustrating an exemplary image displayed to the upper image display panel included in the slot machine forming the gaming system according to one embodiment of the present invention.

FIGS. 2A to 2B are views each illustrating an exemplary image displayed to an upper image display panel included in a slot machine forming a gaming system according to an embodiment of the present invention.

As illustrated in FIG. 1, a gaming system 1 includes a plurality of slot machines 10 (a slot machine 10A, a slot machine 10B, a slot machine 10C, a slot machine 10D, a slot machine 10E, a slot machine 10F, a slot machine 10G, a slot machine 10H, a slot machine 10I, and a slot machine 10J), a control device 200 (see FIG. 5), a common large display 300, and a plurality of common compact displays 301 (a common compact display 301A and a common compact display 301B), which are interconnected through a network.

Further, for the respective slot machines 10, there are provided coupling illuminated lines 310 (a coupling illuminated line 310A, a coupling illuminated line 310B, a coupling illuminated line 310C, a coupling illuminated line 310D, a coupling illuminated line 310E, a coupling illuminated line 310F, a coupling illuminated line 310G, a coupling illuminated line 310H, a coupling illuminated line 310I, and a coupling illuminated line 310J) which include a plurality of LEDs 351 arranged from the common large display 300 to the respective slot machines 10. The coupling illuminated lines 310 are each formed by a straight portion extending from the common large display 300 to one of boundary plates 302 (a boundary plate 302A and a boundary plate 302B), and a bent portion extending from one of the boundary plates 302 to the slot machine 10.

The slot machines 10 correspond to the gaming machines of the present invention.

The LEDs 351 correspond to the illuminants of the present invention.

The common large display 300 corresponds to the reach portion of the present invention.

In the gaming system 1 according to the present embodiment, a part of coins betted in each slot machine 10 are cumulatively counted as a cumulative value. Further, an image indicative of the counted cumulative value is displayed to the common large display 300. In FIG. 1, "123456" is displayed to the common large display 300, indicating that the cumulative value is 123456. When the cumulative value reaches a predetermined value, a payout of coins is conducted as a jackpot to any of the slot machines 10.

With reference to FIG. 2A to FIG. 2B, there is described a method for determining the slot machine 10 to which the payout of coins relating to a jackpot is conducted.

As illustrated in FIG. 2A, text images indicative of precautions for an acquisition of the jackpot are displayed to an upper image display panel 33.

A text image 601 indicates that EVENT TIME (a common game) is generated triggered by the cumulative value having reached the predetermined value.

FIG. 2B illustrates EVENT TIME (a common game) in more detail.

In the present embodiment, the upper image display panel 33 is configured to switch the text images displayed thereto from the text images illustrated in FIG. 2A to the text images illustrated in FIG. 2B triggered by a touch on a predetermined position on a touch panel (not illustrated) provided in the upper image display panel 33.

A text image 602 indicates that the LEDs 351 will be lighted according to the number of points acquired in each slot machine 10 during EVENT TIME (a common game).

During EVENT TIME (a common game), common-game symbols (see FIG. 14) may be rearranged, in addition to symbols (normal symbols, see FIG. 9) rearranged during a game (a normal game) played before the generation of EVENT TIME (a common game). Further, the number of points is determined based on the type and the number of the rearranged common-game symbols.

A text image 603 indicates that coins in number corresponding to the cumulative value will be paid out as the jackpot to the slot machine 10 provided with the coupling illuminated line 310 with all the LEDs 351 having been lighted.

In the present embodiment, the LEDs 351 are lighted according to the number of acquired points, in an order starting from the LED 351 closest to the slot machines 10. Accordingly, the lines of the lighted LEDs 351 appear to gradually extend toward the common large display 300.

A text image 604 indicates that a number of LEDs included in the coupling illuminated line 310 may be different among the coupling illuminated lines 310.

In the present embodiment, the same number of LEDs 351 are included in two coupling illuminated lines 310 listed in each of the following groups (I) to (V):

(I) the coupling illuminated line 310A and the coupling illuminated line 310J;

(II) the coupling illuminated line 310B and the coupling illuminated line 310I;

(III) the coupling illuminated line 310C and the coupling illuminated line 310H;

(IV) the coupling illuminated line 310D and the coupling illuminated line 310G; and (V) the coupling illuminated line 310E and the coupling illuminated line 310F.

However, the numbers of LEDs 351 included in the coupling illuminated line listed in the respective groups (I) to (V) are different from each other.

This difference is caused by the difference in the numbers of LEDs 351 in the bent portions.

The numbers of LEDs 351 in the straight portions are same in all the coupling illuminated lines 310.

Further, FIG. 1 illustrates the gaming system 1 according to the present embodiment schematically, and the number of LEDs 351 illustrated in FIG. 1 is not related to the number of LEDs 351 according to the present embodiment.

A text image 605 indicates that the correspondence relationship between the number of acquired points and the number of LEDs 351 to be lighted may be different in accordance with the coupling illuminated line 310. More specifically, the correspondence relationships between the number of acquired points and the number of LEDs 351 to be lighted are different among the respective groups (I) to (V) (see FIG. 15A).

As above, there has been given the general description of the present embodiment, with reference to FIG. 1 and FIGS. 2A to 2B.

Hereinafter, the present embodiment is described in more detail.

Next, a configuration of the slot machine 10 is described.

Figure 3:
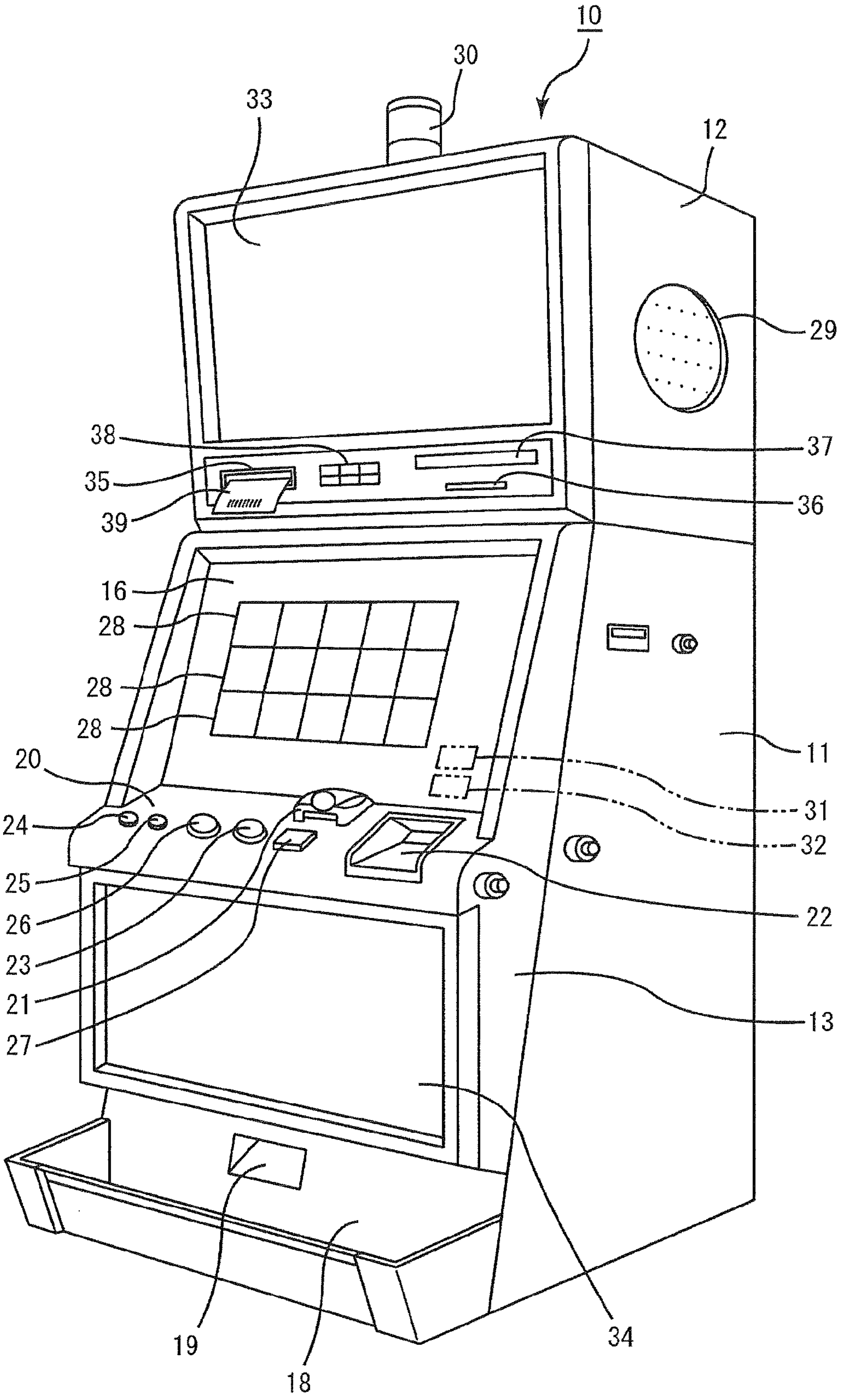
FIG. 3 is a perspective view illustrating an external view of a slot machine forming a gaming system according to a present embodiment.

FIG. 3 is a perspective view illustrating an external view of a slot machine forming a gaming system according to the present embodiment.

In the slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11.

On the main door 13, there is provided a lower image display panel 16 as a display. The lower image display panel 16 includes a transparent liquid crystal panel which displays fifteen display blocks 28 along five columns and three rows. A single symbol is displayed in each display block 28. Further, although not illustrated, various types of images relating to an effect, as well as the aforementioned images, are displayed to the lower image display panel 16.

The lower image display panel 16 corresponds to the symbol display of the present invention.

Further, a number-of-credits display portion 31 and a number-of-payouts display portion 32 are provided on the lower image display panel 16. The number-of-credits display portion 31 displays an image indicative of the number of credited coins. The number-of-payouts display portion 32 displays an image indicative of the number of coins to be paid out.

Moreover, although not shown, a touch panel 69 is provided at the front face of the lower image display panel 16. The player can operate the touch panel 69 to input a variety of commands.

Below the lower image display panel 16, there are provided a control panel 20 including a plurality of buttons 23 to 27 with each of which a command according to game progress is inputted by the player, a coin receiving slot 21 through which a coin is accepted into the cabinet 11, and a bill validator 22.

The control panel 20 is provided with a start button 23, a change button 24, a CASHOUT button 25, a 1-BET button 26 and a maximum BET button 27. The start button 23 is for inputting a command to start scrolling of symbols. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (50 coins in the present embodiment) out of credited coins.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely, below the control panel 20, there is provided a belly glass 34 on which a character or the like of the slot machine 10 is drawn.

On the front surface of the top box 12, there is provided the upper image display panel 33. The upper image display panel 33 includes a liquid crystal panel, which displays, for example, images indicative of introductions of the contents of games and explanations about the rules of games as illustrated in FIG. 2A and FIG. 2B.

Further, a speaker 29 is provided in the top box 12. Under the upper image display panel 33, there are provided a ticket printer 35, a card reader 36, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The identification number of the slot machine 10 corresponds to identification information of the gaming machine of the present invention.

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 37 includes a fluorescent display and the like, and displays, for example, data read by the card reader 36 or data inputted by the player via the key pad 38. The key pad 38 is used for inputting a command and data concerning issuing of a ticket, and the like.

Figure 4:
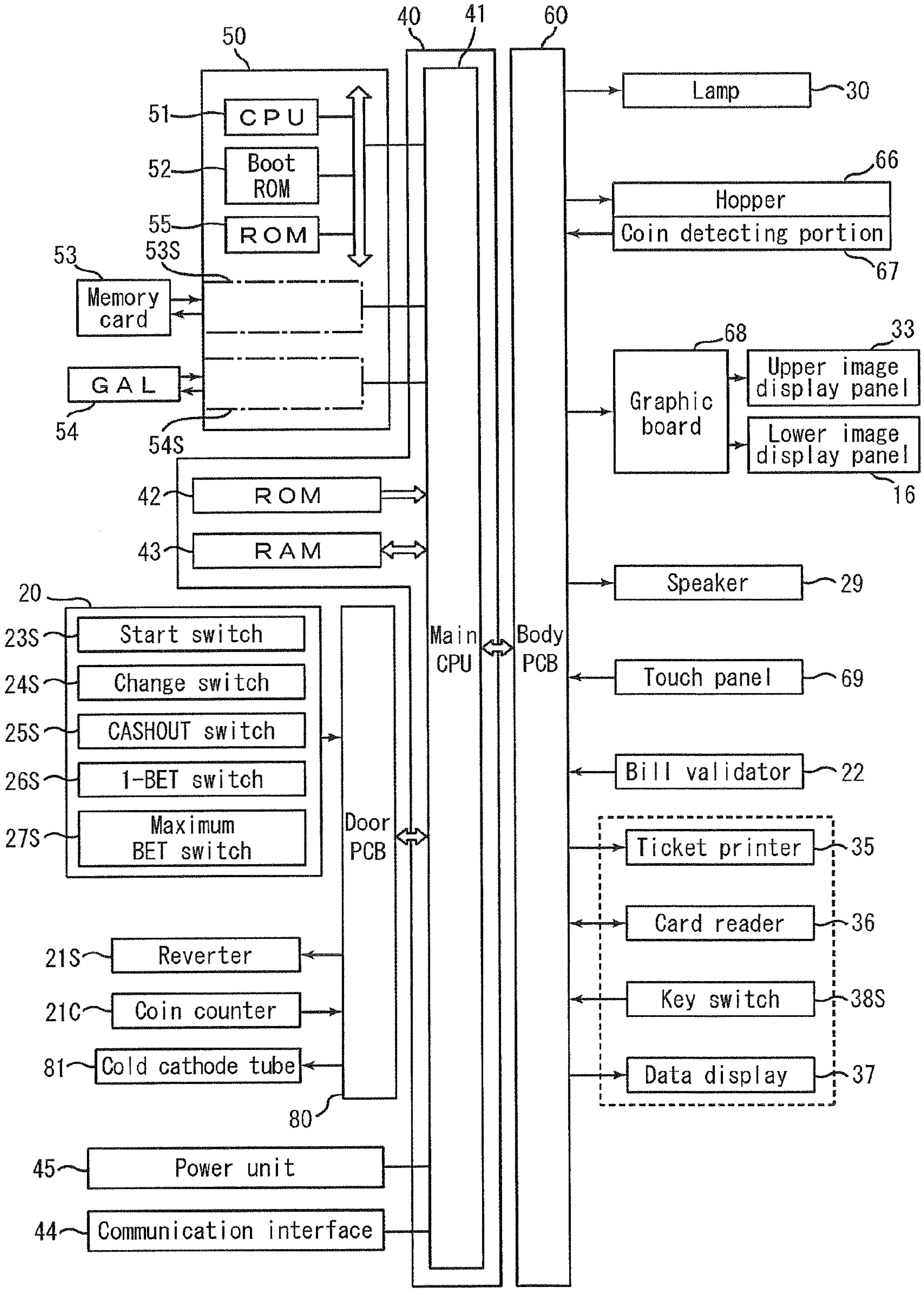
FIG. 4 is a block diagram illustrating an internal configuration of the slot machine shown in FIG. 3.

FIG. 4 is a block diagram showing an internal configuration of the slot machine shown in FIG. 3.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program. The game program includes a symbol determination program. The symbol determination program is a program for determining symbols to be rearranged in the display blocks 28.

The symbol determination program includes a symbol determination program for a normal game and a symbol determination program for a common game. The symbols to be determined by the symbol determination program for a normal game includes 8 types of symbols including "RIBBON", "HEART", "STAR", "MOON", "SUN", "JEWEL", "CROWN", and "SMILE". On the other hand, the symbols to be determined by the symbol determination program for a common game includes 5 types of symbols (common-game symbols) including "10", "J", "Q", "K", and "A", in addition to the aforementioned 8 types of symbols (normal symbols).

Further, the card slot 53S is configured so as to allow the memory card 53 to be inserted thereinto or removed therefrom, and is connected to the mother board 40 by an IDE bus. Therefore, the memory card 53 can be removed from the card slot 53S, and then another game program is written into the memory card 53, and the memory card 53 can be inserted into the card slot 53S, to change the type and contents of a game played on the slot machine 10. The game program includes a program according to progress of the game. Further, the game program includes image data and sound data to be outputted during the game.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and provided with a main CPU 41, a ROM (Read Only Memory) 42, a RAM (RandomAccessMemory) 43, and a communication interface 44. The mother board 40 corresponds to the controller of the present invention.

The ROM 42 comprises a memory device such as a flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program stored in the memory card 53 via the gaming board 50. It is to be noted that, in the present invention, the ROM 42 may or may not be data rewritable one.

The ROM 42 stores odds data indicative of a correspondence relationship among a type and a number of rearranged normal symbols and an amount of payouts (see FIG. 9), and the like.

The RAM 43 stores data and a program to be used at the time of operation of the main CPU 41. Further, the RAM 43 is capable of storing a game program.

Moreover, the RAM 43 stores data of the number of credits, the numbers of coin-ins and coin-outs in one game, and the like.

Moreover, the mother board 40 is connected with a later-described body PCB (Printed Circuit Board) 60 and a door PCB 80 through respective USBs. Further, the mother board 40 is connected with a power supply unit 45 and the communication interface 44.

The body PCB 60 and the door PCB 80 are connected with an equipment and a device that generate an input signal to be inputted into the main CPU 41 and an equipment and a device operations of which are controlled by a control signal outputted from the main CPU 41. The main CPU 41 executes the game program stored in the RAM 43 based on the input signal inputted into the main CPU 41, and thereby executes the predetermined arithmetic processing, stores the result thereof into the RAM 43, or transmits a control signal to each equipment and device as processing for controlling each equipment and device.

The body PCB 60 is connected with a lamp 30, a hopper 66, a coin detecting portion 67, a graphic board 68, the speaker 29, the touch panel 69, the bill validator 22, the ticket printer 35, the card reader 36, a key switch 38S and the data display 37. The lamp 30 is lighted in a predetermined pattern based on control signals outputted from the main CPU 41.

The hopper 66 is installed inside the cabinet 11, and pays out a predetermined number of coins based on the control signal outputted from the main CPU 41, from a coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. In the respective display blocks 28 on the lower image display panel 16, symbols are displayed in a scrolling manner or in a stopped state. The number of credits stored in the RAM 43 is displayed to the number-of-credits display portion 31 of the lower image display panel 16. Further, the number of coin-outs is displayed to the number-of-payouts display portion 32 of the lower image display panel 16.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35, based on the control signal outputted from the main CPU 41, prints on a ticket a barcode as coded data of the number of credits stored in the RAM 43, a date, and an identification number of the slot machine 10, and the like, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the keypad 38, and outputs a predetermined input signal to the main CPU 41 when the key pad 38 is operated by the player. The data display 37 displays data read by the card reader 36 and data inputted by the player via the key pad 38, based on the control signal outputted from the main CPU 41.

The door PCB 80 is connected with the control panel 20, a reverter 21S, a coin counter 21C, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. Each of the switches 23S to 27S outputs an input signal to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and lighted up based on the control signal outputted from the main CPU 41.

Figure 5:
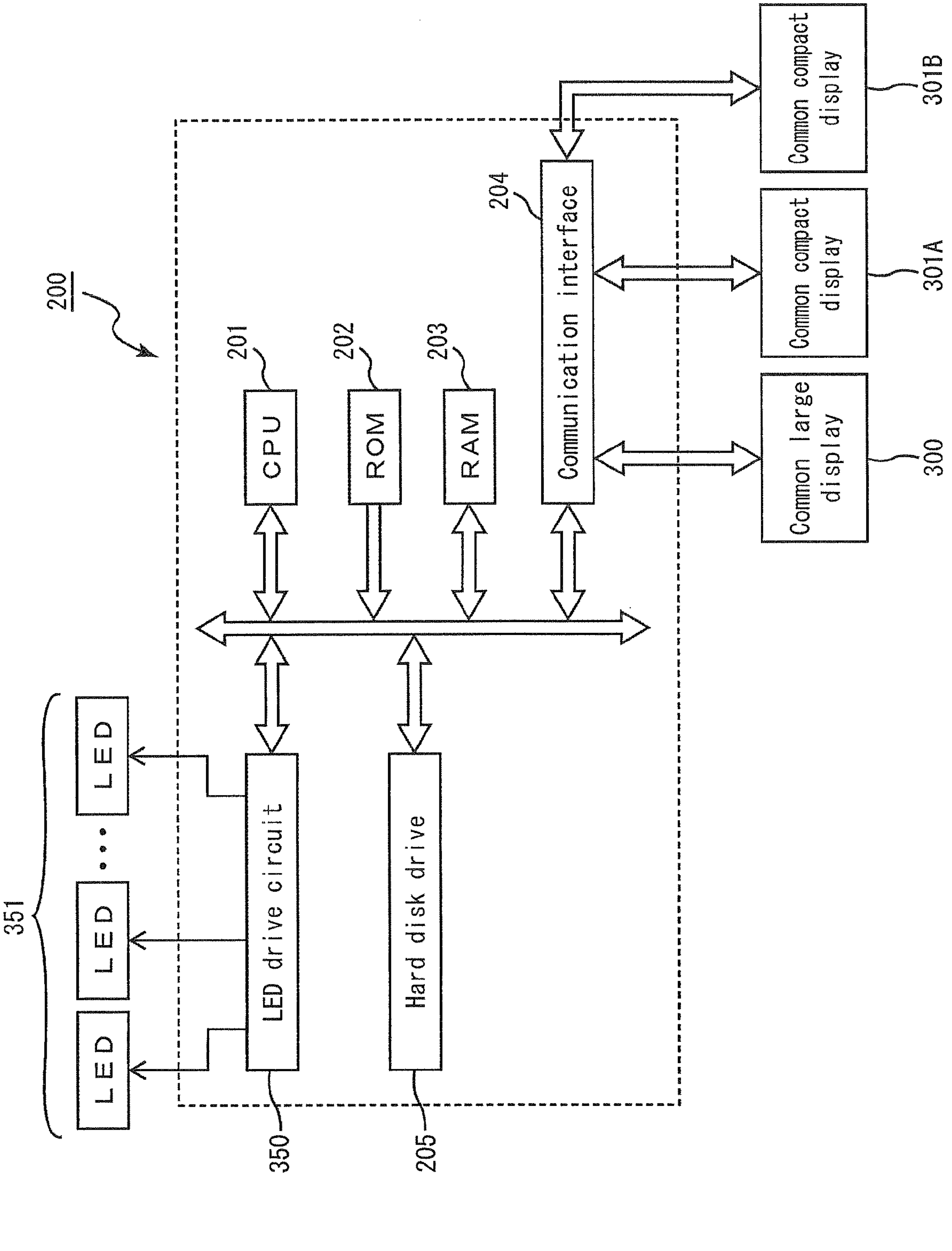
FIG. 5 is a block diagram illustrating an internal configuration of a control device forming the gaming system according to one embodiment of the present invention.

FIG. 5 is a block diagram illustrating an internal configuration of a control device forming the gaming system according to an embodiment of the present invention.

The control device 200 includes a CPU 201, a ROM 202, a RAM 203, a communication interface 204, a LED drive circuit 350 and a hard disk drive 205 as a memory. The communication interface 204 is connected, through communication lines 101, to the communication interfaces 44 in the respective slot machines 10 and also is connected to the common large display 300 and the common compact displays 301 through communication lines 102. The ROM 202 stores a system program for controlling the operation of a processor, permanent data, and the like. Further, the RAM 203 stores cumulative-value data indicative of the cumulative value, number-of-lights data indicative of the number of LEDs 351 which have been lighted, out of the LEDs 351 included in the coupling illuminated line 310 provided for each slot machine 10, data received from each slot machine 10, and the like.

The hard disk drive 205 stores number-of-lighting determination table data indicative of a plurality of types of number-of-lighting determination tables (a number-of-lighting determination table for bent portions and a number-of-lighting determination table for straight portions).

Further, the hard disk drive 205 stores number-of-points determination table data to be referred to in determining the number of points in the common game.

Furthermore, the hard disk drive 205 stores data indicative of the predetermined value.

The plurality of LEDs 351 are connected to the LED drive circuit 350. The LEDs 351 are associated with respective identification numbers, and the LED drive circuit 350 turns on and turns off the LEDs 351 based on a signal received from the CPU 201.

Figure 6:
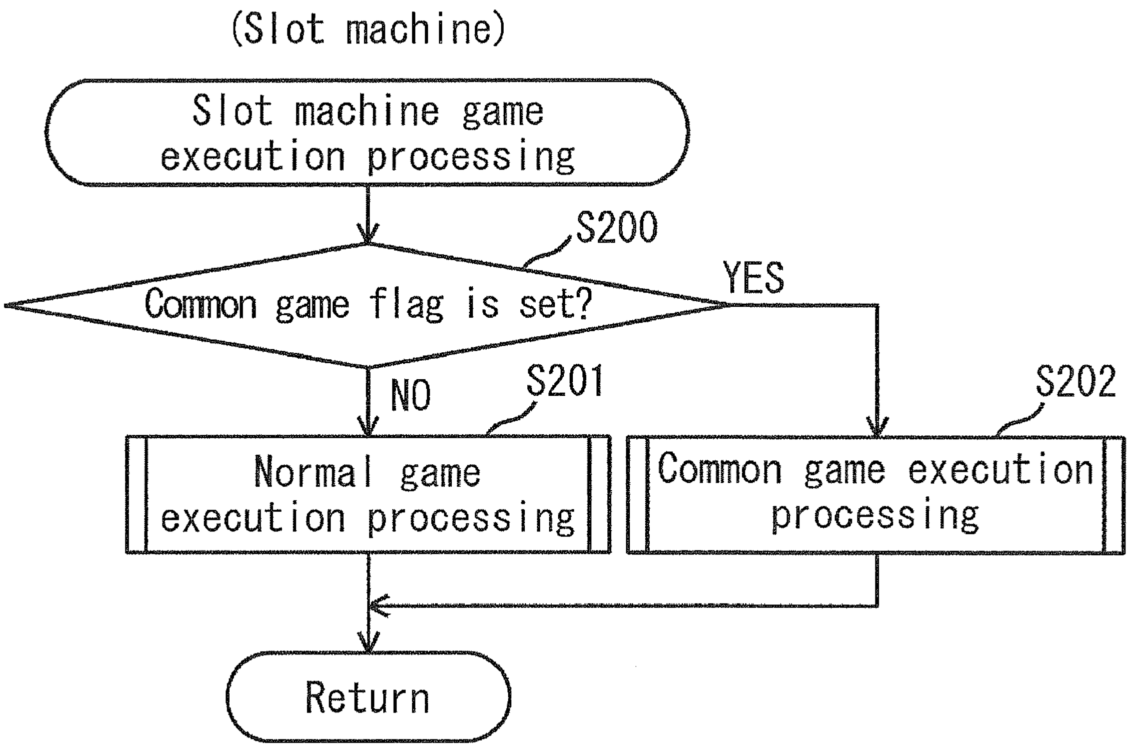
FIG. 6 is a flowchart illustrating slot-machine game execution processing executed in a slot machine.

FIG. 6 is a flowchart illustrating slot-machine game execution processing executed in the slot machines.

At first, the main CPU 41 determines whether or not a common-game flag is set (step S200).

Figure 7:
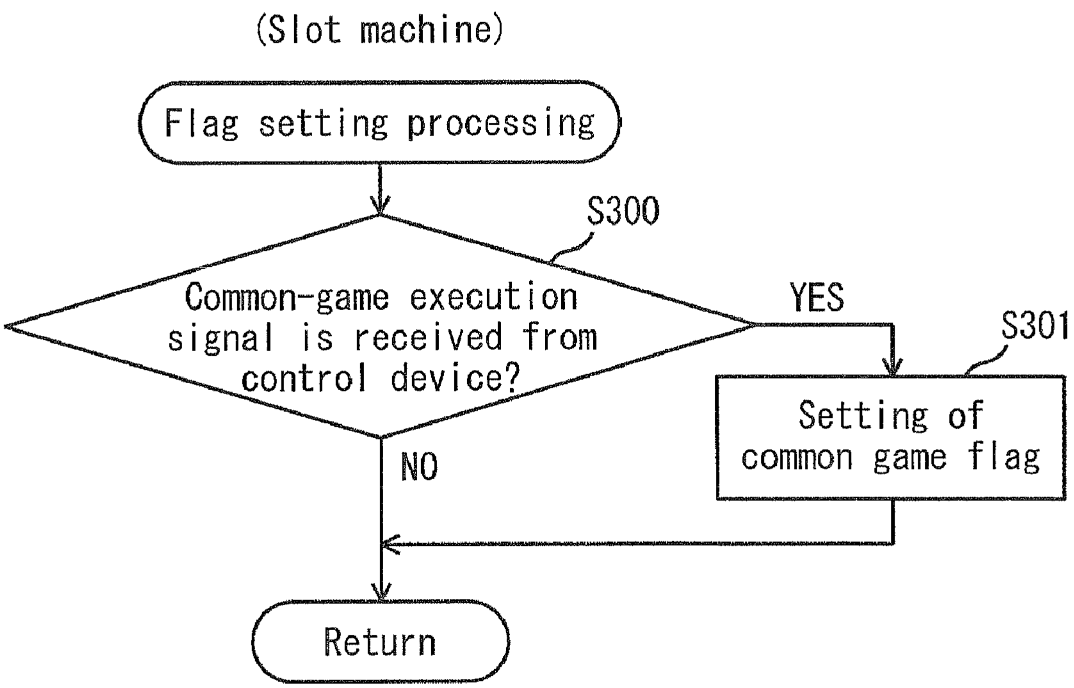
FIG. 7 is a flowchart illustrating a subroutine of flag setting processing.

With reference to FIG. 7, the common-game flag is described.

FIG. 7 is a flowchart illustrating a subroutine of flag setting processing.

At first, the main CPU 41 determines at a predetermined timing whether or not to have received a common-game execution signal (see FIG. 12) (step S300).

When determining not to have received the common-game execution signal, the main CPU 41 completes the present subroutine.

On the other hand, when determining to have received the common-game execution signal, the main CPU 41 sets the common-game flag (step S301) and completes the present subroutine.

As described above, the common-game flag is a flag indicating that a condition for executing the common game is satisfied.

When determining in step S200 in FIG. 6 that the common-game flag is not set, the main CPU 41 executes normal game execution processing (step S201). The normal game execution processing will be described in more detail later with reference to the drawing.

On the other hand, when determining that the common-game flag is set, the main CPU 41 executes common game execution processing (step S202). The common game execution processing will be described in more detail later with reference to the drawing. After executing the processing of step S202, the main CPU 41 completes the present subroutine.

Figure 8:
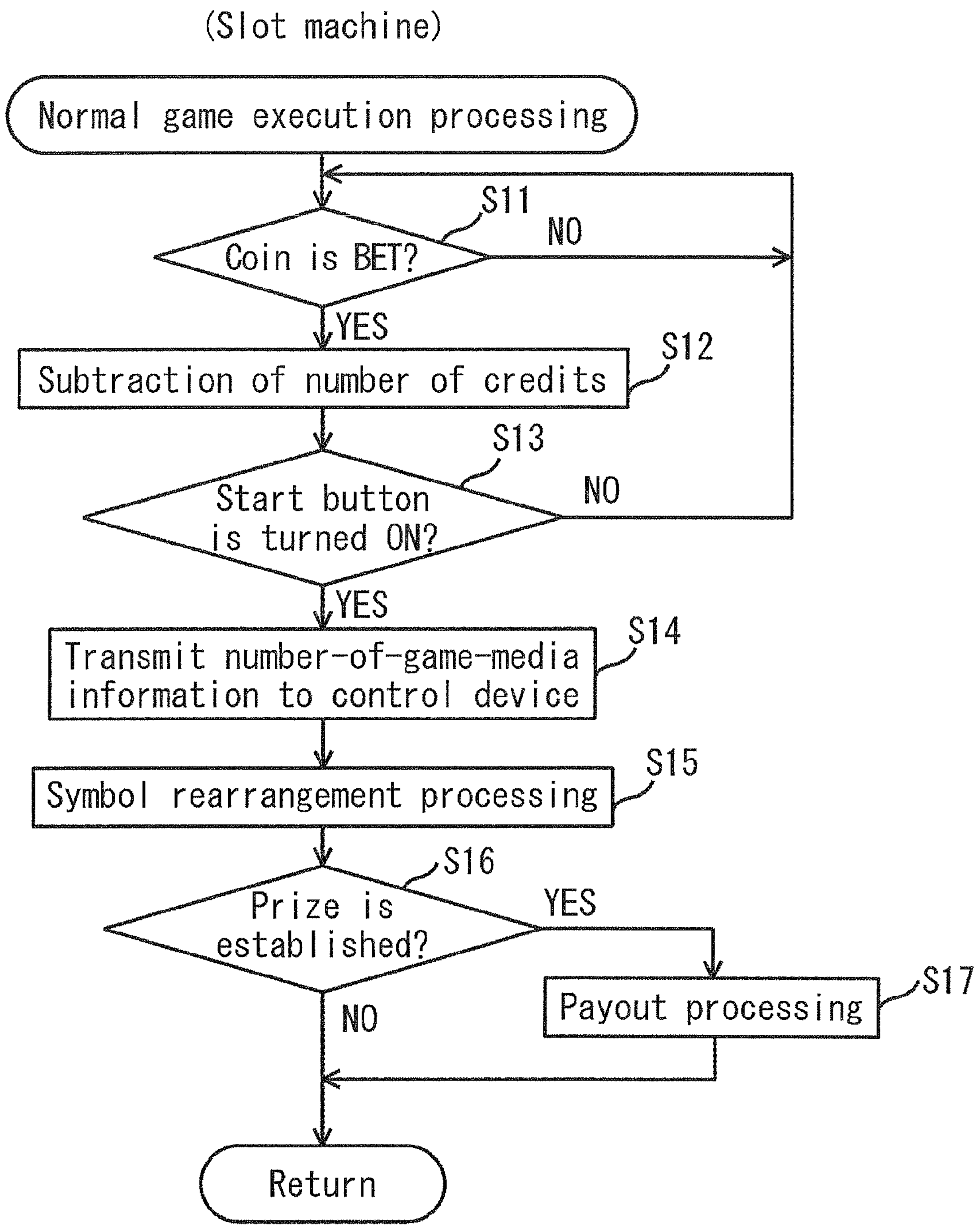
FIG. 8 is a flowchart illustrating a subroutine of normal game execution processing.

FIG. 8 is a flowchart illustrating a subroutine of normal game execution processing.

FIG. 9 is a view illustrating correspondence relationship among a type and a number of rearranged normal symbols and an amount of payouts.

First, the main CPU 41 determines whether or not a coin has been betted (step S11). In this processing, the main CPU 41 determines whether or not to have received an input signal that is outputted from the 1-BET switch 26S when the 1-BET button 26 is operated, or an input signal that is outputted from the maximum BET switch 27S when the maximum BET button 27 is operated. When the main CPU 41 determines that the coin has not been betted, the processing is returned to step S11.

On the other hand, when determining that the coin has been betted in step S11, the main CPU 41 conducts processing for making a subtraction from the number of credits stored in the RAM 43 according to the number of betted coins (step S12). It is to be noted that, when the number of coins to be betted is larger than the number of credits stored in the RAM 43, the main CPU 41 does not conduct the processing for making a subtraction from the number of credits stored in the RAM 43, and the processing is returned to step S11. Further, when the number of coins to be betted exceeds the upper limit of the number of coins that can be betted in one game (50 coins in the present embodiment), the main CPU 41 does not conduct the processing for making a subtraction from the number of credits stored in the RAM 43, and the processing is proceeded to step S13.

Next, the main CPU 41 determines whether or not the start button 23 has been turned ON (step S13). In this processing, the main CPU 41 determines whether or not to have received an input signal that is outputted from the start switch 23S when the start button 23 is pressed.

When the main CPU 41 determines that the start button 23 has not been turned on, the processing is returned to step S11.

It is to be noted that, when the start button 23 is not turned ON (e.g. when the start button 23 is not turned ON and a command to end the game is inputted), the main CPU 41 cancels a subtraction result in step S12.

On the other hand, when determining in step S13 that the start button 23 has been turned on, the main CPU 41 transmits number-of-game-media information indicative of the number of betted coins to the control device 200 (step S14). The number-of-game-media information includes the identification number of the slot machine 10.

Next, the main CPU 41 executes symbol rearrangement processing (step S15).

In this processing, at first, the main CPU 41 starts scrolling-display of normal symbols in the display blocks 28. Then, the main CPU 41 executes the aforementioned normal-game symbol determination program, so as to determine the normal symbols to be rearranged, and then rearranges the normal symbols in the display blocks 28.

The lower image display panel 16 to which the display blocks 28 are displayed corresponds to the symbol display of the present invention.

Next, the main CPU 41 determines whether or not a prize has been established (step S16). Here, the establishment of a prize refers to a rearrangement of at least one combination of three or more normal symbols of the same type out of "RIBBON", "HEART", "STAR", "MOON", "SUN", "JEWEL", "CROWN", and "SMILE", in the display blocks 28 (see FIG. 9). In this processing, the main CPU 41 counts the number of normal symbols for each type of the normal symbols rearranged in step S15. Then, the main CPU 41 determines whether or not the counted number is three or more.

When determining that a prize has been established, the main CPU 41 executes processing relating to the payout of coins (step S17) In the processing, the main CPU 41 determines the amount of payout based on the numbers of rearranged normal symbols with reference to the odds data stored in the ROM 42.

The odds data is data indicative of the correspondence relationship between the number of normal symbols rearranged in the display blocks 28 and the amount of payouts (see FIG. 9).

For example, in the case that two coins have been betted, when three "SUNs" are rearranged, 20 (=2×10) coins are paid out.

In the case of accumulating coins, the main CPU 41 conducts processing for adding the number of credits corresponding to the determined amount of payout to the number of credits stored in the RAM 43. On the other hand, in the case of paying out coins, the main CPU 41 transmits a control signal to the hopper 66 in order to pay out coins in an amount corresponding to the determined amount of payout.

When determining in step S16 that no prize has been established or after executing the processing of step S17, the main CPU 41 completes the present subroutine.

Subsequently, the common game execution processing is described with reference to FIG. 10.

Figure 10:
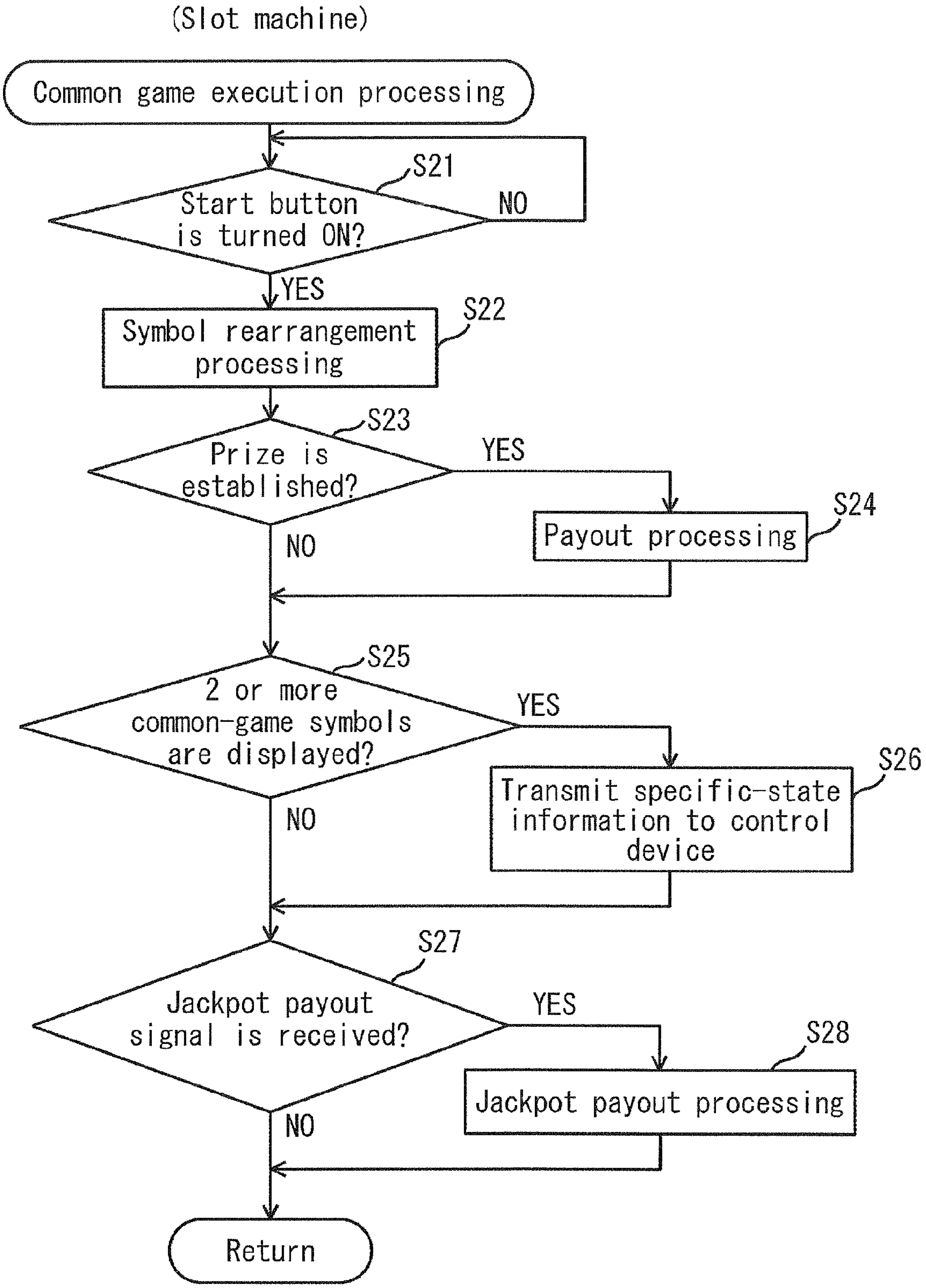
FIG. 10 is a flowchart illustrating a subroutine of common game execution processing.

FIG. 10 is a flowchart illustrating a subroutine of the common game execution processing.

Figure 11:
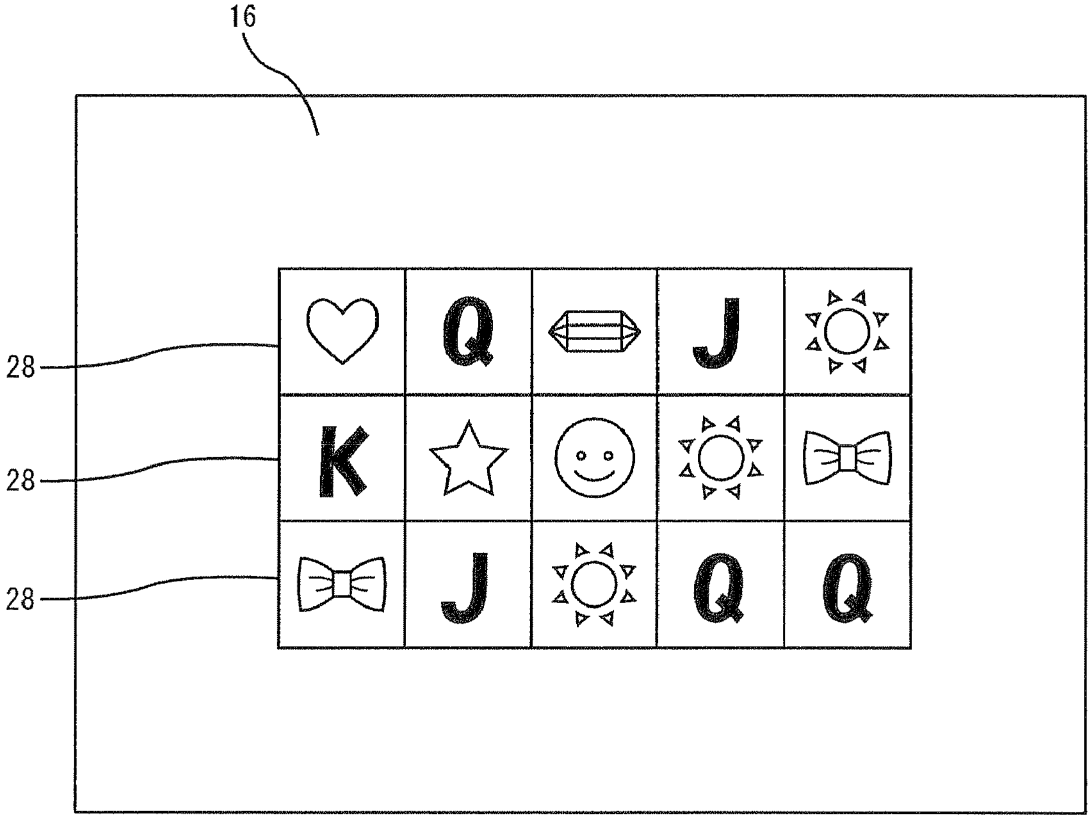
FIG. 11 is a view illustrating exemplary symbols rearranged in display blocks during a common game.

FIG. 11 is a view illustrating exemplary symbols rearranged in the display blocks during the common game.

At first, the main CPU 41 executes processing of steps S21 to S24, and these processing are substantially the same as the processing of step S13 and steps S15 to S17 in FIG. 8. Here, only a part different from step S13 and steps S15 to S17 in FIG. 8 is described.

There has been described a case where the main CPU 41 executes the normal-game symbol determination program in step S15 in FIG. 8 for determining normal symbols to be rearranged, and then, rearranges the normal symbols in the display blocks 28. On the contrary, in step S22 in FIG. 10, the main CPU 41 executes the common-game symbol determination program for determining normal symbols and/or common-game symbols to be rearranged, and then, rearranges the normal symbols and/or the common-game symbols in the display blocks 28.

As described above, in the present embodiment, the normal symbols are 8 types of symbols including “RIBBON”, “HEART”, “STAR”, “MOON”, “SUN”, “JEWEL”, “CROWN”, and “SMILE”. On the other hand, the common-game symbols are 5 types of symbols including “10”, “J”, “Q”, “K”, and “A”.

FIG. 11 illustrates a case where “J”, “Q”, and “K” are rearranged as common-game symbols.

When determining in step S23 that no prize has been established or after executing the processing of step S24, the main CPU 41 determines whether or not 2 or more common-game symbols of the same type are rearranged in step S22. When determining that 2 or more common-game symbols of the same type are not rearranged, the main CPU 41 shifts the processing to step S27.

On the other hand, when determining that 2 or more common-game symbols of the same type are rearranged, the main CPU 41 transmits specific-state information to the control device 200 (step S26). The specific-state information is information indicative of the type and the number of the common-game symbols rearranged in step S22. The specific-state information corresponds to the common-game result information of the present invention.

In the example in FIG. 11, two symbols of “J”, three symbols of “Q”, and one symbol of “K” are rearranged as the common-game symbols. In this case, the specific-state information includes information indicating that two symbols of “J” and three symbols of “Q” are rearranged.

Next, the main CPU 41 determines whether or not to have received a jackpot payout signal (step S27). The jackpot payout signal is a signal transmitted from the control device 200 to any of the slot machines 10 triggered by all the LEDs 351 included in the coupling illuminated line 310 provided for the slot machine 10 having been lighted (see FIG. 13). The jackpot payout signal includes information indicative of the cumulative value.

When determining to have received the jackpot payout signal, the main CPU 41 executes jackpot payout processing (step S28). In this processing, the main CPU 41 pays out coins in number corresponding to the cumulative value based on the information indicative of the cumulative value which is included in the jackpot payout signal. The processing executed by the main CPU 41 in step S28 includes output of an annunciation sound from the speaker 29, lighting of the lamp 30, print of the ticket 39 with a barcode indicative of the number of coins to be paid out printed thereon, and the like.

When determining not to have received a jackpot payout signal in step S27 or after executing the processing of step S28, the main CPU 41 completes the present subroutine.

Subsequently, processing executed by the control device 200 is described.

Figure 12:
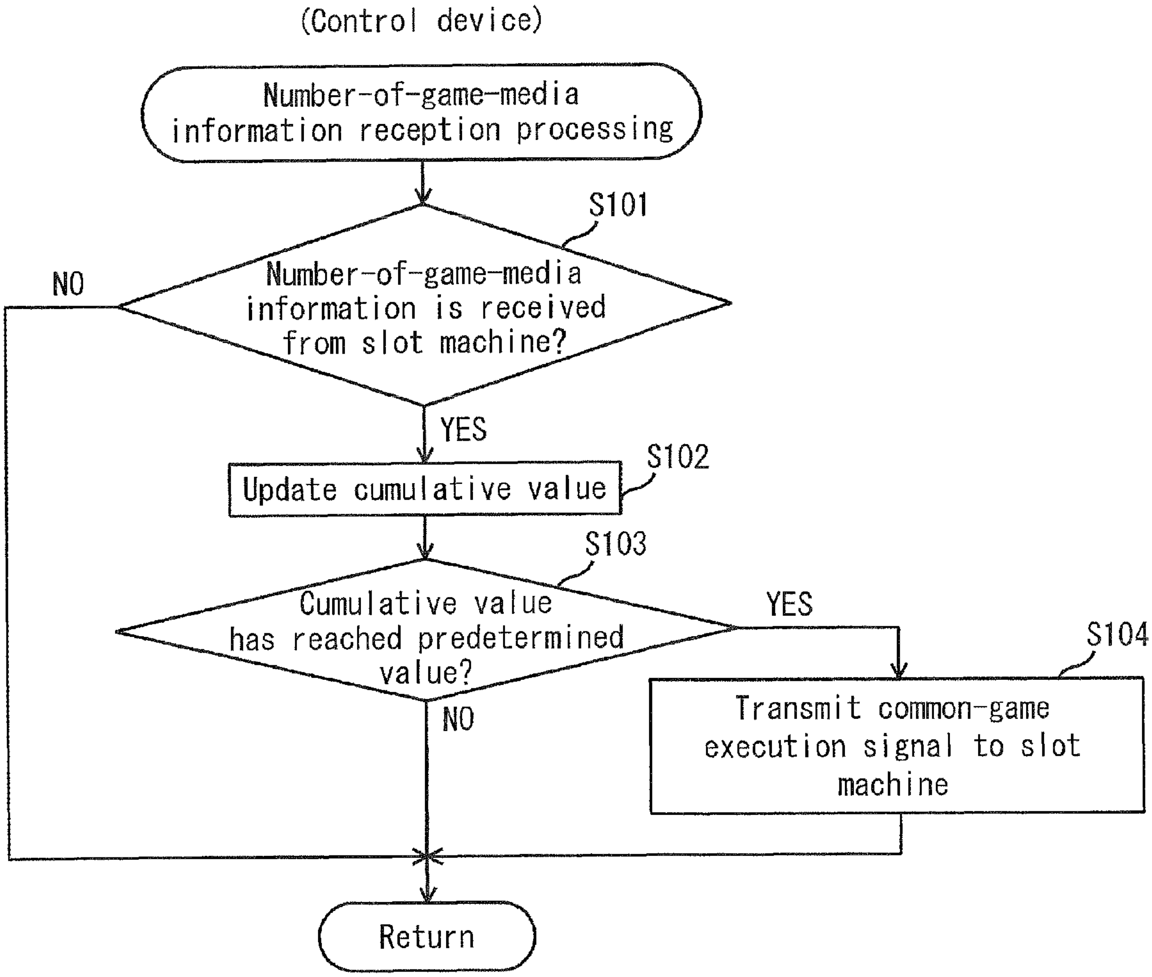
FIG. 12 is a flowchart illustrating a subroutine of number-of-game-media information reception processing.

FIG. 12 is a flowchart illustrating a subroutine of number-of-game-media information reception processing.

At first, the CPU 201 determines whether or not to have received the number-of-game-media information from the slot machine 10 at a predetermined timing (step S101).

When determining not to have received the number-of-game-media information, the CPU 201 completes the present subroutine.

On the other hand, when determining to have received the number-of-game-media information, the CPU 201 adds a part (10% in the present embodiment) of the number of coins indicated by the received number-of-game-media information to the cumulative value indicated by the cumulative-value data stored in the RAM 203 and stores the numerical value obtained by the addition as the updated cumulative value in the cumulative-value data (step S102). It is to be noted that the number of decimals is truncated.

Next, the CPU 201 determines whether or not the cumulative value has reached the predetermined value, based on the cumulative-value data stored in the RAM 203 (step S103). When determining that the cumulative value has not reached the predetermined value, the CPU 201 completes the present subroutine.

On the other hand, when determining that the cumulative value has reached the predetermined value in step S103, the CPU 201 transmits the common-game execution signal to the slot machines 10 (step S104).

Figure 13:
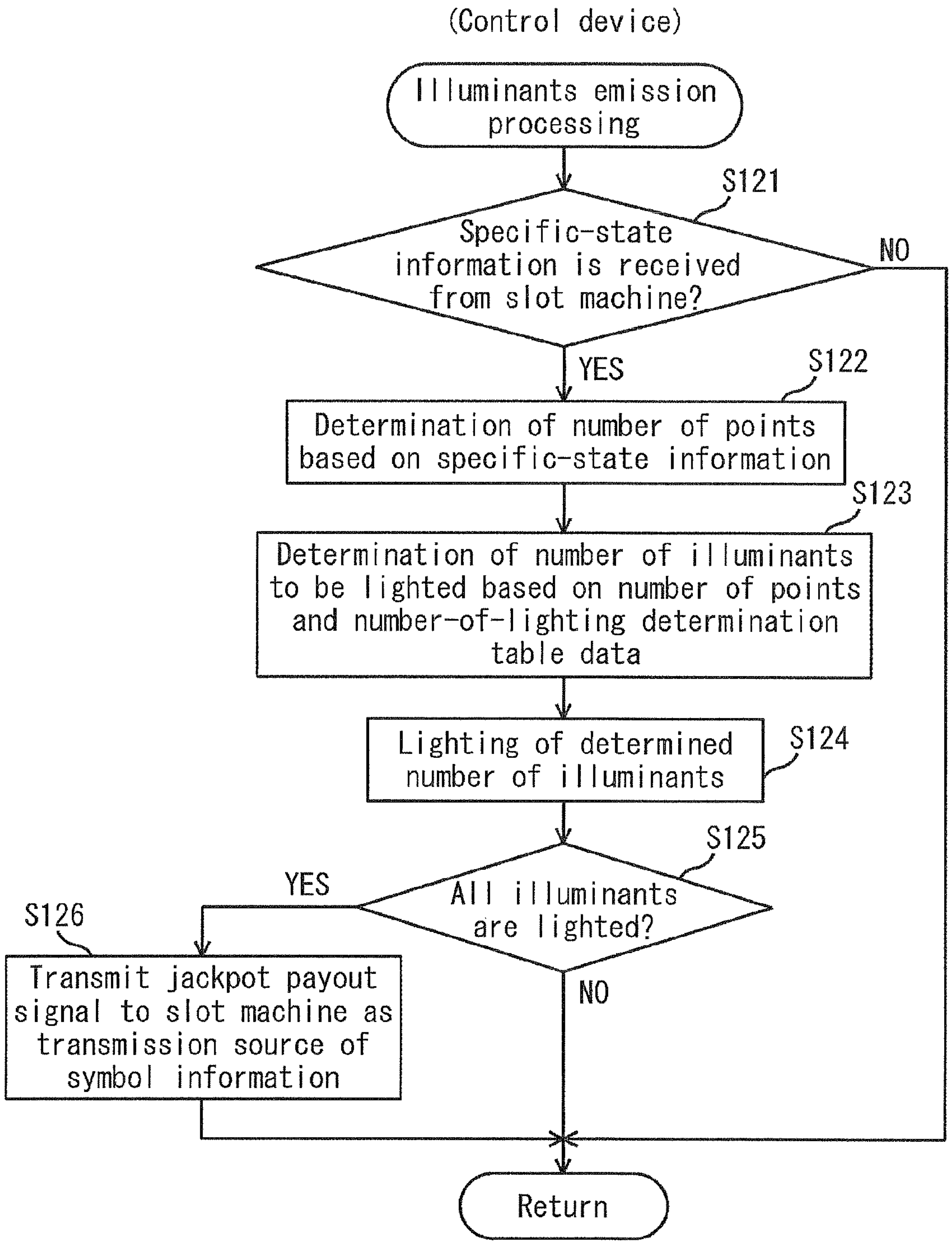
FIG. 13 is a flowchart illustrating a subroutine of illuminants emission processing.

FIG. 13 is a flowchart illustrating a subroutine of illuminants emission processing.

At first, the CPU 201 determines whether or not to have received the specific-state information (see FIG. 10) from the slot machine 10 at a predetermined timing (step S121).

When determining not to have received the specific-state information, the CPU 201 completes the present subroutine.

On the other hand, when determining to have received the specific-state information, the CPU 201 determines the number of points, based on the specific-state information and the number-of-points determination table data stored in the hard disk drive 205 (step S122).

FIG. 14 is a view illustrating the number-of-points determination table.

As illustrated in FIG. 14, the number-of-points determination table indicates the correspondence relationship between the types and the number of rearranged common-game symbols and the number of points.

For example, as illustrated in FIG. 11, when two symbols of “J”, three symbols of “Q” and one symbol of “K” are rearranged as the common-game symbols in the common game executed in a single slot machine 10, the slot machine 10 transmits to the control device the specific-state information including information indicating that two symbols of “J” and three symbols of “Q” are rearranged. On receiving the specific-state information, the CPU 201 determines 8 (=2+6) as the number of points.

As illustrated in FIG. 14, the number of points which varies in accordance with the type of the common-game symbol is offered. Further, the number of points which varies in accordance with the number of the common-game symbols is offered.

Next, the CPU 201 determines the number of LEDs 351 (illuminants) to be lighted (emit light) based on the determined number of points and the number-of-lighting determination table data (step S123).

FIGS. 15A to 15B are views each illustrating the number-of-lighting determination table.

The number-of-lighting determination table is a table in which the possible range of the number of points and the number of LEDs 351 to be lighted are associated with each other. Further, in the number-of-lighting determination tables, the correspondence relationship between the number of points and the number of LEDs 351 to be lighted is associated with each slot machine 10.

The number-of-lighting determination table includes the number-of-lighting determination table for bent portions (see FIG. 15A) and the number-of-lighting determination table for straight portions (see FIG. 15B).

In the number-of-lighting determination table for bent portions, correspondence relationships between the number of points and the number of LEDs 351 to be lighted may be different in accordance with the slot machines 10.

In the number-of-lighting determination table for straight portions, the correspondence relationships between the number of points and the number of LEDs 351 to be lighted are the same in all the slot machines 10.

In the processing of step S123, at first, the CPU 201 determines whether or not the number of lights indicated by the number-of-lights data stored in the RAM 203 in association with the identification number of the slot machine 10 as a transmission source of the specific-state information received in step S121 is equal to or more than a predetermined number (the number of LEDs 351 included in the bent portion of the coupling illuminated line 310).

When determining that the number of lights is equal to or more than the predetermined number, the CPU 201 determines the number of LEDs 351 to be lighted based on the number-of-lighting determination table for straight portions.

On the other hand, when determining that the number of lights is less than the predetermined number, the CPU 201 determines the number of LEDs 351 to be lighted based on the number-of-lighting determination table for bent portions.

Next, the CPU 201 makes the determined number of LEDs (illuminants) be lighted (emit light) in the coupling illuminated line 310 provided for the slot machine 10 as a transmission source of the specific-state information received in step S121 (step S124).

In this processing, the CPU 201 identifies the identification numbers of the LEDs 351 to be lighted, based on the number determined in step S123 and the number of lights indicated by the number-of-lights data stored in the RAM 203 in association with the identification number of the slot machine 10. Further, the CPU 201 transmits to the LED drive circuit 350 a signal including information indicative of the identified identification numbers. On receiving this signal, the LED drive circuit 350 lights the LEDs 351 associated with the identification numbers included in the signal.

Further, after transmitting the signal, the CPU 201 adds the number determined in step S123 to the number of lights indicated by the number-of-lights data stored in association with the identification number of the slot machine 10 and stores the obtained number in the RAM 203.

Next, the CPU 201 determines whether or not all the LEDs 351 (illuminants) included in the coupling illuminated line 310 provided for the slot machine 10 as a transmission source of the specific-state information received in step S121 have been lighted (emit light) (step S125). In the processing, the CPU 201 determines whether or not the number of lights after the addition of the number determined in step S123 has reached the number of LEDs 351 included in the coupling illuminated line 310, based on the number-of-lights data stored in the RAM 203.

When determining that all the LEDs 351 included in the coupling illuminated line 310 provided for the slot machine 10 as a transmission source of the specific-state information received in step S121 have been lighted, the CPU 201 transmits the jackpot payout signal to the slot machine 10 (step S126).

When determining that not all the LEDs 351 have been lighted or after executing the processing of step S126, the CPU 201 completes the present subroutine.

As above, according to the gaming system 1 of the present embodiment, the control device 200 cumulatively counts a part of the number of game media betted in each of the slot machines 10 as a cumulative value. Further, when the cumulative value reaches a predetermined value, a common game is executed in the slot machine 10. In the common game, the slot machine 10 repeatedly executes the processing of variably displaying the symbol and stop-displaying the symbol, without accepting the bet of the game media. Upon execution of the common game, the control device 200 determines the number of points to be offered to each slot machine 10 based on the number or the combination of the stop-displayed symbols, and lights the LEDs 351 included in the coupling illuminated line provided for each slot machine 10 based on the determined number of points. Then, the control device 200 pays out the predetermined number of game media to the slot machine 10 provided with the coupling illuminated line 310 with all the LEDs 351 included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the LEDs 351 included in the coupling illuminated line 310 provided for each of the slot machines 10. This can cause the player to play the common game while having a sense of expectation. Further, payout of the predetermined number of game media is conducted when all the LEDs 351 included in the coupling illuminated line 310 have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

According to the gaming system 1, in the case that the number or the combination of the stop-displayed symbols is in the specific state out of a plurality of specific states, the number of points which varies in accordance with a type of the specific state is offered. For example, as illustrated in FIG. 14, the number of points which varies in accordance with the type of the common-game symbols is offered. Further, the number of points which varies in accordance with the number of the common-game symbols is offered. Namely, since the number of points to be offered is different in accordance with the number or the combination of the stop-displayed symbols, an interesting aspect of the game is broadened. Consequently, it is possible to have the player play the game while being entertained.

In the present embodiment, there has been described a case where the symbols rearranged in the display blocks 28 are all scatter symbols. However, symbols in the present invention are not limited to the scatter symbols. For example, in the configuration that a pay line is provided, a prize may be established or a point value may be offered when a plurality of symbols in a specific combination are rearranged on the pay line. Further, for example, the symbol to be rearranged on the pay line so as to establish a prize and the scatter symbol may be used in combination.

Further, in the present embodiment, there has been described a case where a single predetermined value is provided. However, in the present invention, a plurality of predetermined values may be provided. In such a case, after the cumulative value has reached the predetermined value, a single predetermined value to be used next may be determined out of the plurality of predetermined values.

Further, in the present embodiment, there has been described a case where the number of points is determined in the control device 200. However, in the present invention, the number of points may be determined in the gaming machine and information indicative of the determined number of points may be transmitted to the control device.

Further, in the present embodiment, there has been described a case where the number of LEDs 351 to be lighted is determined based on the number-of-lighting determination table data for bent portions when the current number of lights of the LEDs 351 is less than the predetermined number (the number of LEDs 351 included in the bent portion of the coupling illuminated line 310), while the number of LEDs 351 to be lighted is determined based on the number-of-lighting determination table data for straight portions when the current number of lights of the LEDs 351 is equal to or more than the predetermined number (the number of LEDs 351 included in the bent portion of the coupling illuminated line 310). In this case, it is desirable that the number of LEDs to be lighted in the bent portion for a number of points of "1" is set to be greater than the number of LEDs to be lighted in the straight portion for a number of points of "1". This is because such a structure can cause the player to have a sense of expectation for the acquisition of the greater number of points just before the number of LEDs having been lighted reaches the predetermined number.

Further, in the present embodiment, there has been described a case where the common game is a game in which a game result is determined based on rearranged symbols (normal slot machine game). However, in the present invention, the common game is not limited to the case, and a game different from the slot machine game may be played. For example, a card game such as poker, and a game such as a shooting game and a fighting game may be played. In this case, it is desirable to allow players to play the game against one another. This is because such a configuration can enhance player's senses of competition, thereby further having the players become absorbed in the common game.

For example, a following configuration can be adopted.

Namely, each gaming machine is capable of storing a program for executing such a common game. Each gaming machine reads and executes the program, triggered by a reception of a common-game execution signal. Then, the gaming machine transmits information indicative of the result of the common game to the control device. The control device compares the results of the common game in respective gaming machines, so as to determine the number of LEDs to be lighted in the coupling illuminated line provided for each gaming machine.

Further, in the present embodiment, there has been described a case where the number of the slot machine 10 is 10. However, the number of the gaming machine is not particularly limited, and it may be five, for example.

Furthermore, in the present embodiment, there has been described a case where the number of the common compact display 301 is two. However, the number of the common compact display is not particularly limited, and it may be three, for example.

Moreover, in the present embodiment, there has been described a case where the gaming machine is the slot machine 10. However, in the present invention, the type of the gaming machine is not particularly limited, and it may be a card game machine, for example.

Figure 16:
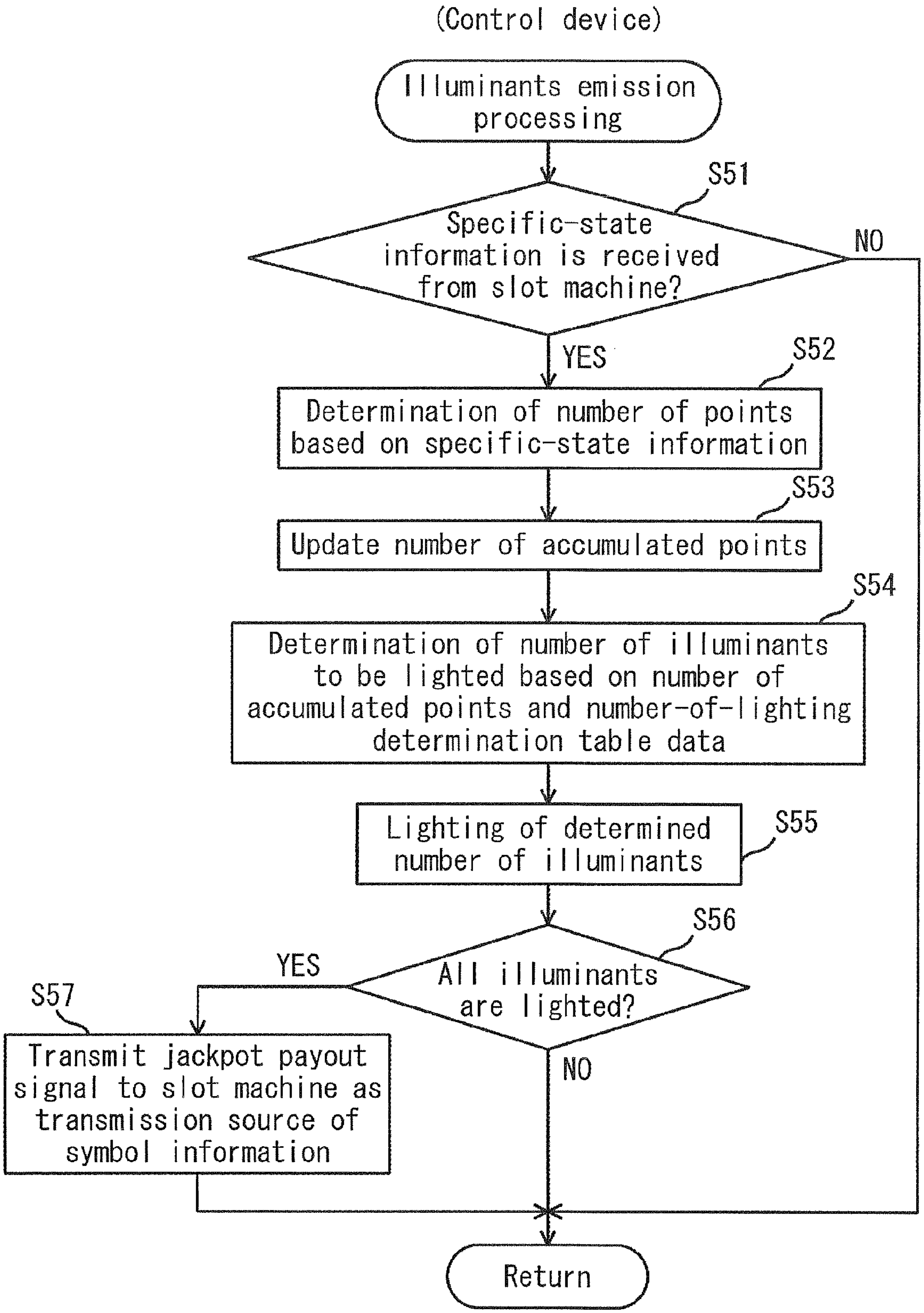
FIG. 16 is a flowchart illustrating a subroutine of illuminants emission processing according to another embodiment.

FIG. 16 is a flowchart illustrating a subroutine of illuminants emission processing according to another embodiment.

First, the CPU 201 executes the processing of step S51 to step S52. The processing is the same as the processing of step S120 to step S122 in FIG. 13, and therefore, the description thereof is omitted here.

The CPU 201 stores in the RAM 203 the numerical value obtained by adding the number of points determined in step S52 to the number of accumulated points currently stored in association with the identification number of the slot machine 10 as a transmission source of the specific-state information received in step S51 as the updated number of accumulated points, in the RAM 203 in association with the identification number of the slot machine 10 as a transmission source of the specific-state information received in step S51 (step S54).

Next, the CPU 201 determines the number of LEDs (illuminants) to be lighted (emit light), based on the number of accumulated points stored in the RAM 203 in association with the identification number of the slot machine 10 as a transmission source of the specific-state information received in step S51 and the number-of-lighting determination table data.

FIGS. 17A to 17C are views each illustrating a number-of-lighting determination table.

The number-of-lighting determination table is a table in which the number of accumulated points and the number of LEDs to be lighted are associated with each other. Further, a correspondence relationship between the number of accumulated points and the number of LEDs to be lighted is associated with each slot machine 10.

The number-of-lighting determination table includes a number-of-lighting determination table for bent portions (FIG. 17A) and a number-of-lighting determination table for straight portions (FIG. 17B).

In the number-of-lighting determination table for bent portions, the correspondence relationships between the number of accumulated points and the number of LEDs 351 to be lighted may be different in accordance with the slot machines 10.

In the number-of-lighting determination table for straight portions, the correspondence relationships between the number of accumulated points and the number of LEDs 351 to be lighted are the same in all the slot machines 10.

In the processing of step S54, the CPU 201 first reads the number of accumulated points stored in the RAM 203. In the case that the read number of accumulated points is equal to or less than 100, the CPU 201 determines the number of LEDs 351 to be lighted based on the number-of-lighting determination table for bent portions.

On the other hand, in the case that the read number of accumulated points is equal to or more than 101, the CPU 201 determines the number of LEDs 351 to be lighted based on the number-of-lighting determination table for straight portions.

Next, the CPU 201 makes the determined number of LEDs (illuminants) be lighted (emit light) in the coupling illuminated line 310 provided for the slot machine 10 as a transmission source of the specific-state information received in step S51 (step S55).

In this processing, the CPU 201 identifies the identification numbers of the LEDs 351 to be lighted, based on the number determined in step S54 and the number of lights indicated by the number-of-lights data stored in the RAM 203 in association with the identification number of the slot machine 10. Further, the CPU 201 transmits to the LED drive circuit 350 a signal including information indicative of the identified identification numbers. On receiving this signal, the LED drive circuit 350 lights the LEDs 351 associated with the identification numbers included in the signal.

Furthermore, after transmitting the signal, the CPU 201 adds the number determined in steps S54 to the number of lights indicated by the number-of-lights data stored in association with the identification number of the slot machine 10 and stores the obtained number in the RAM 203.

Next, the CPU 201 determines whether or not all the LEDs 351 (illuminants) included in the coupling illuminated line 310 provided for the slot machine 10 as a transmission source of the specific-state information received in step S51 have been lighted (emit light) (step S56). In the processing, the CPU 201 determines whether or not the number of lights after the addition of the number determined in step S54 has reached the number of LEDs 351 included in the coupling illuminated line 310, based on the number-of-lights data stored in the RAM 203.

When determining that all the LEDs 351 included in the coupling illuminated line 310 provided for the slot machine 10 as a transmission source of the specific-state information received in step S51 have been lighted, the CPU 201 transmits the jackpot payout signal to the slot machine 10 (step S57).

When determining in step S56 that not all the LEDs 351 have been lighted or after executing the processing of step S57, the CPU 201 completes the present subroutine.

As above, according to the gaming system 1 of another embodiment, the control device 200 cumulatively counts a part of the number of game media betted in each of the slot machines 10 as a cumulative value. Further, when the cumulative value reaches a predetermined value, a common game is executed in the slot machine 10. In the common game, the slot machine 10 repeatedly executes the processing of variably displaying the symbol and stop-displaying the symbol, without accepting the bet of the game media. Upon execution of the common game, the control device 200 determines the number of points to be offered to each slot machine 10 based on the number or the combination of the stop-displayed symbols, and counts the number of points cumulatively as a number of accumulated points. The control device 200 lights the LEDs 351 included in the coupling illuminated line 310 provided for each slot machine 10 based on the counted number of accumulated points. Then, the control device 200 pays out the predetermined number of game media to the slot machine 10 provided with the coupling illuminated line 310 with all the LEDs 351 included therein having been lighted. By executing the common game different from a normal game, it is possible to enhance an interesting aspect of the method itself for paying out the accumulated game media, and as a result, the player hardly gets tired of the game. The player can recognize how much each of the players has come close to the acquisition of the predetermined number of game media by viewing the LEDs 351 included in the coupling illuminated line 310 provided for each of the slot machines 10. This can cause the player to play the common game while having a sense of expectation. Further, payout of the predetermined number of game media is conducted when all the LEDs 351 included in the coupling illuminated line 310 have been lighted. This makes the rules easy to understand, thereby allowing even a beginner to play the game without having uncomfortable feeling. Further, since the player can play the game without betting the game media during the execution of the common game, the player can play the game without caring a loss of the game media. Accordingly, it is possible to have the player concentrated on the game, thereby having the player absorbed in the game.

In the aforementioned embodiment, there has been described a case where normal symbols (see FIG. 9) are rearranged in the normal game, while common-game symbols (see FIG. 14), in addition to the normal symbols, are rearranged in the common game. However, in the present invention, symbols rearranged in the normal game and the common game are not limited to the case.

Hereinafter, with reference to FIGS. 18A to 18C, and FIGS. 19 to 22, there will be described symbols to be rearranged in another embodiment.

It is to be noted that, in the following description, the constituent elements as same as those of the gaming system 1 according to the aforementioned embodiment will be provided with the same numerals.

Further, the description will be omitted with regard to a part in the following embodiment to which the description of the aforementioned embodiment is applicable.

At first, with reference to FIGS. 18A to 18C and FIG. 19, the normal game according to another embodiment will be described.

FIGS. 18A to 18C are views each illustrating a relationship between a combination of symbols rearranged on a winning line and a number of coin-outs in the normal game according to another embodiment.

Figure 19:
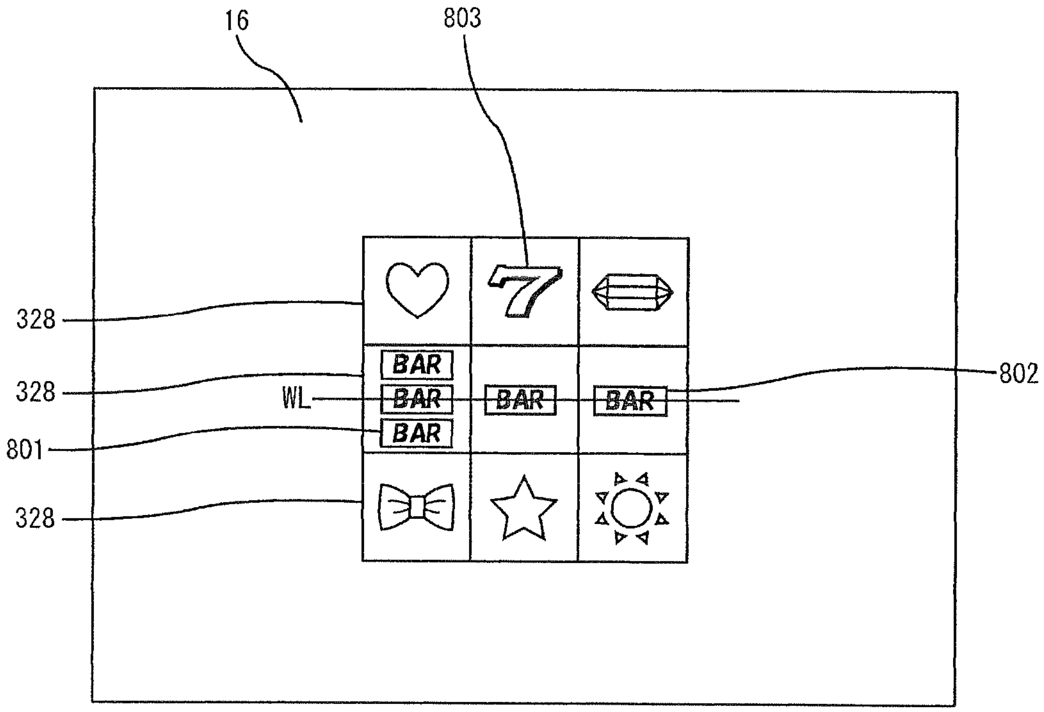
FIG. 19 is a view illustrating exemplary symbols rearranged in display blocks in another embodiment.

FIG. 19 is a view illustrating exemplary symbols rearranged in display blocks in another embodiment.

As illustrated in FIG. 19, nine symbols in total can be rearranged in three rows and three columns, in display blocks 328 according to the present embodiment. A winning line WL is set on the center row. When symbols in a predetermined combination are rearranged on the winning line WL, a payout of coins is conducted.

In the present embodiment, the maximum number of coins which can be betted on a single game is three.

As illustrated in FIGS. 18A to 18C, in the present embodiment, the relationship between the combination of symbols and the number of coin-outs is set to be different in a case where the number of betted coins is 1, in a case where the number of betted coins is 2, and in a case where the number of betted coins is 3.

Figure 22A:
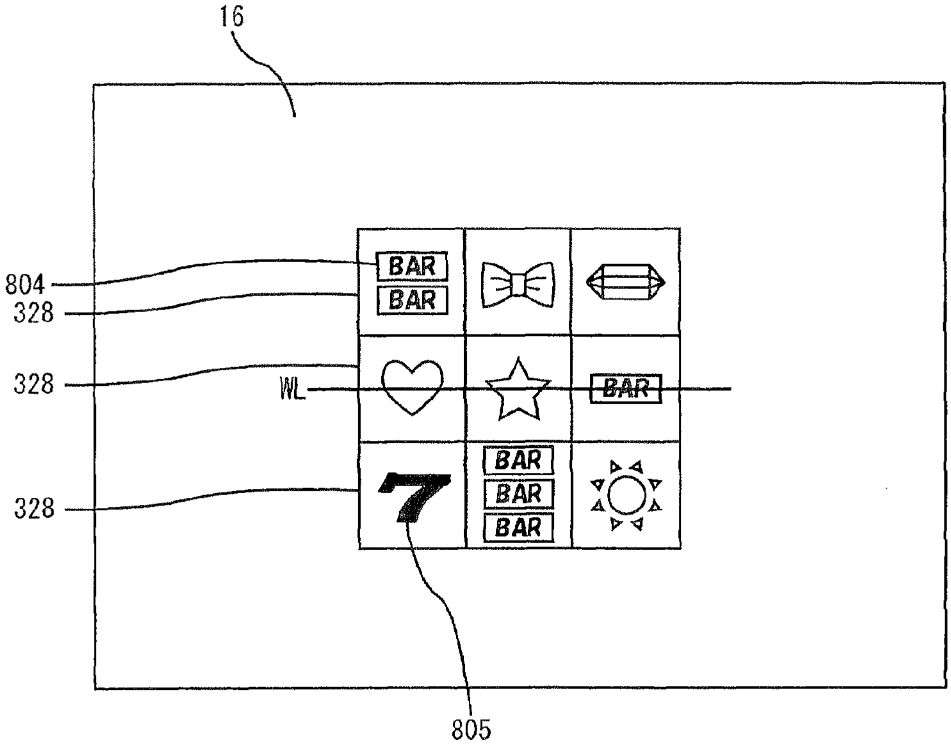
FIG. 22A is a view illustrating exemplary symbols rearranged in display blocks in another embodiment.

In the figure, “3bar” is a symbol 801 illustrated in FIG. 19, “2bar” is a symbol 804 illustrated in FIG. 22A, and “1bar” is a symbol 802 illustrated in FIG. 19. Further, “anybar” is any of “3bar”, “2bar” and “1bar”.

Figure 22B:
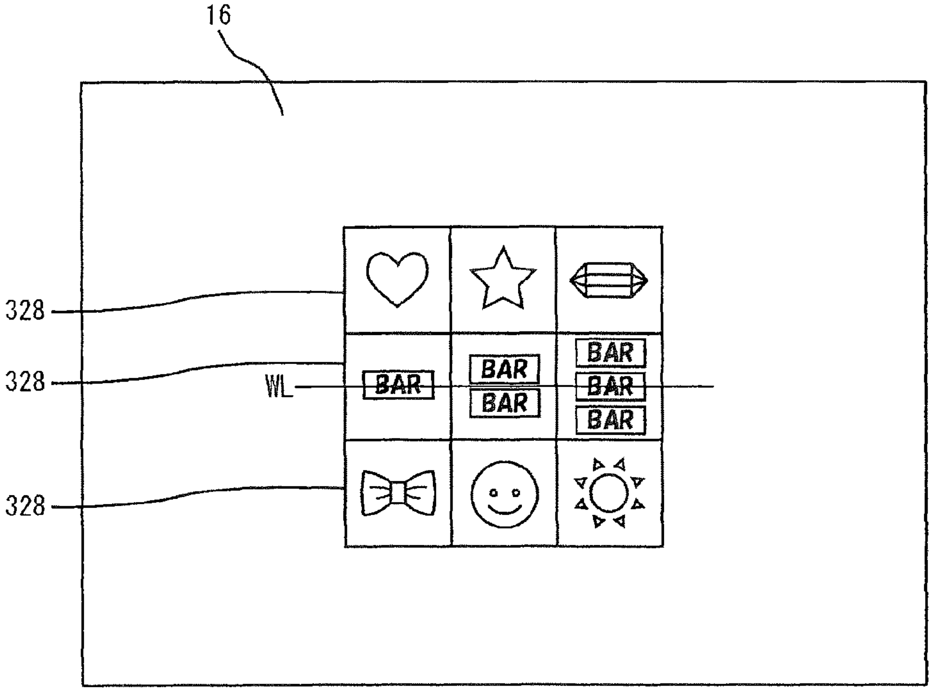
FIG. 22B is a view illustrating exemplary symbols rearranged in display blocks in another embodiment.
Figure 22C:
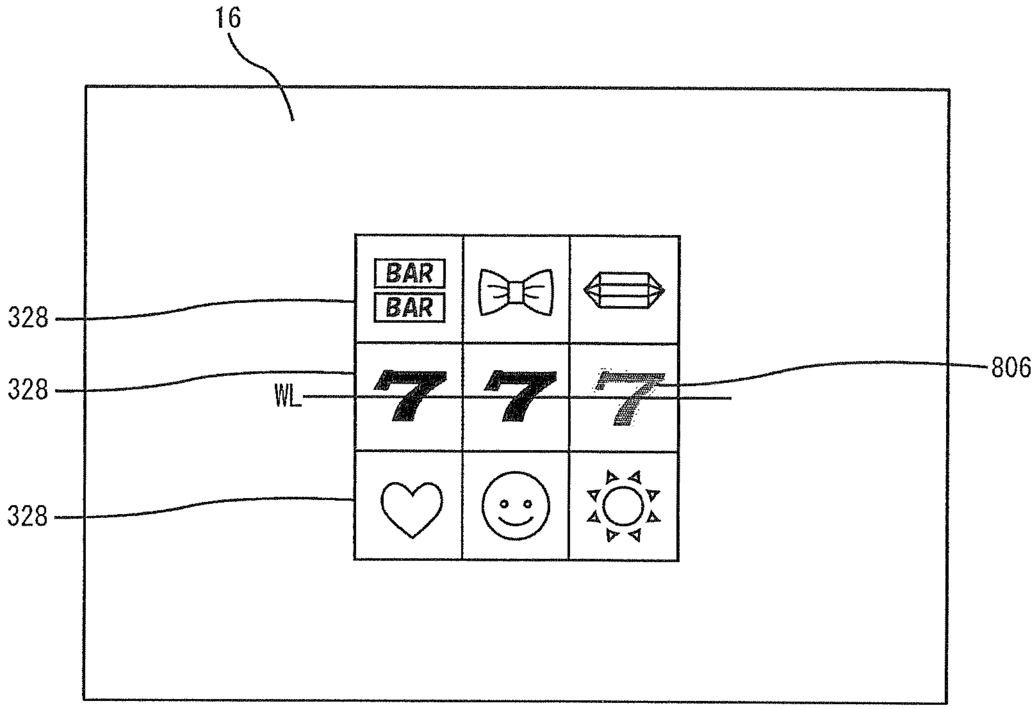
FIG. 22C is a view illustrating exemplary symbols rearranged in display blocks in another embodiment.

Further, “blue7” is a symbol 806 illustrated in FIG. 22C, “red7” is a symbol 805 illustrated in FIG. 22A, and “white7” is a symbol 803 illustrated in FIG. 19.

Furthermore, in the present embodiment, 8 types of symbols including “RIBBON”, “HEART”, “STAR”, “MOON”, SUN”, “JEWEL”, CROWN”, and “SMILE” may be also rearranged, in addition to “3bar”, “2bar”, “1bar”, “blue7”, “red7”, and “white7”.

Moreover, the ROM 42 stores data indicative of the relationship between the combination of symbols and the number of coin-outs.

In the present embodiment, the main CPU 41 executes the following processing of step S16 in FIG. 8, since the present embodiment is different from the aforementioned embodiment in the above described respects.

Namely, the main CPU 41 determines that a prize has been established, in a case where at least one combination of symbols is established on the winning line WL, out of “3bar×3”, “2bar×3”, “1bar×3”, “anybar×3”, “blue7×3”, “red7×3”, “white7×3”, “RIBBON×3”, “HEART×3”, “STAR×3”, “MOON×3”, “SUN×3”, “JEWEL×3”, “CROWN×3”, and “SMILE×3”.

In step S17, the main CPU 41 pays out coins in number determined based on the data indicative of a relationship between the combination of symbols and the number of coin-outs (see FIGS. 18A to 18C).

For example, in the game on which a single coin has been betted, when a symbol combination of “3bar-1bar-1bar” is established on the winning line WL as illustrated in FIG. 19, ten coins will be paid out, since this combination corresponds to “anybar-anybar-anybar”.

Hereinabove, the normal game has been described.

Subsequently, the common game will be described with reference to FIGS. 20 to 21, and FIGS. 22A to 22C.

In the aforementioned embodiment, there has been described a case where common-game symbols are rearranged in the common game, in addition to normal symbols, and the number of points is determined based on the type and the number of the rearranged common-game symbols.

On the contrary, in the present embodiment, the symbols of the same type are rearranged in both the normal game and the common game.

Further, in the aforementioned embodiment, there has been described a case where the main CPU 41 transmits the specific-state information to the control device 200 when two or more common-game symbols are displayed in the common game.

On the contrary, in the present embodiment, the main CPU 41 transmits the specific-state information to the control device 200 when a specific symbol ("blue7", "red7", "3bar", "2bar", and "1bar") is rearranged on the winning line WL.

Figure 20:
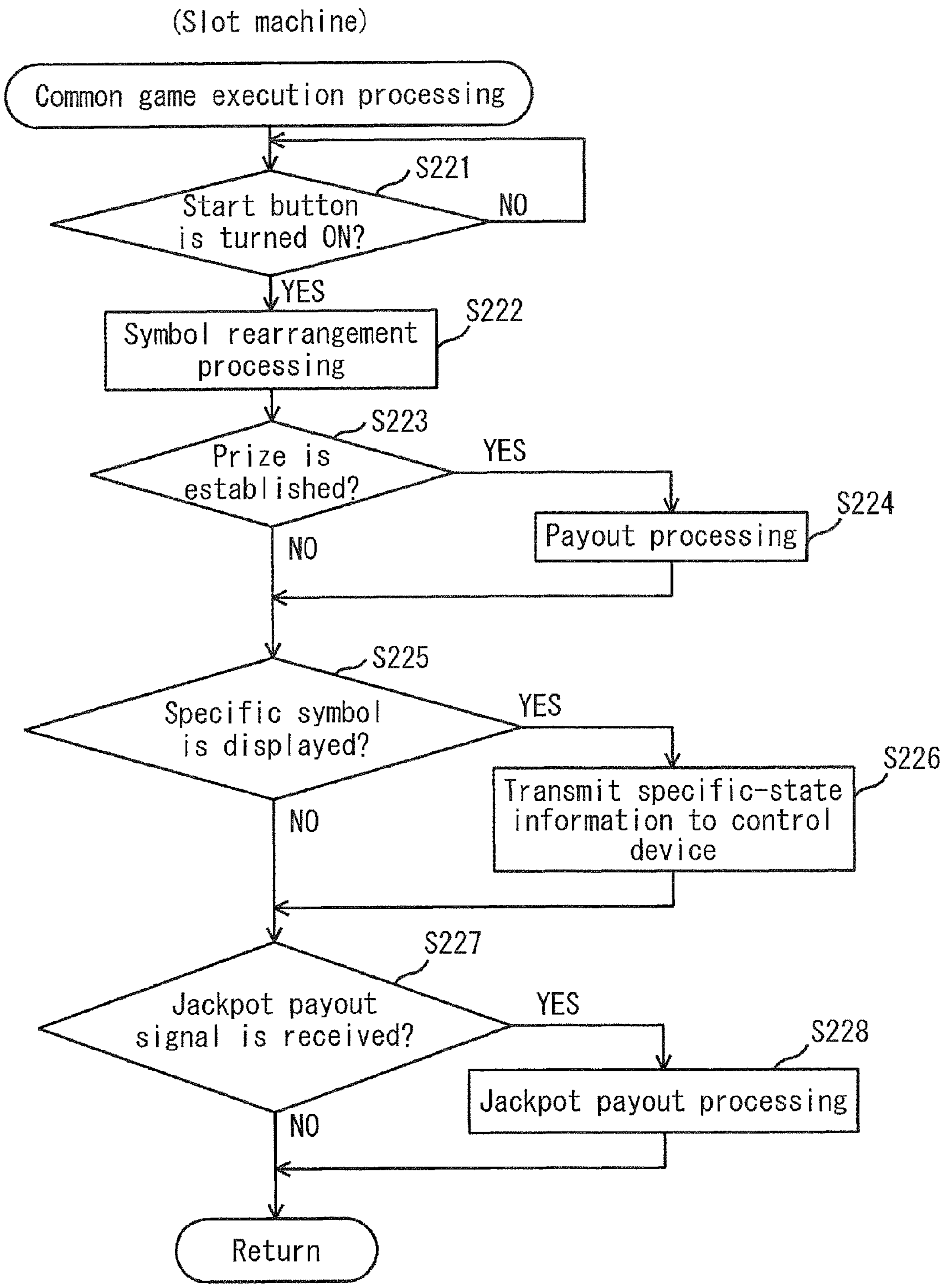
FIG. 20 is a flowchart illustrating a subroutine of common game execution processing according to another embodiment.

FIG. 20 is a flowchart illustrating a subroutine of common game execution processing according to another embodiment.

The main CPU 41 executes the processing of step S221 to step S222. The processing is the same as the processing of step S21 to step S22 in FIG. 10, and therefore, the description thereof is omitted here.

Next, the main CPU 41 determines whether or not a prize has been established (step S223). Namely, the main CPU 41 determines that a prize has been established, in a case where at least one combination of symbols is established on the winning line WL, out of "3bar×3", "2bar×3", "1bar×3", "anybar×3", "blue7×3", "red7×3", "white7×3", "RIBBON×3", "HEART×3", "STAR×3", "MOON×3", "SUN×3", "JEWEL×3", "CROWN×3", and "SMILE×3".

When determining in step S223 that the prize has not been established, the main CPU 41 shifts the processing to step S225. On the other hand, when determining in step S223 that the prize has been established, the main CPU 41 executes processing regarding the payout of the coin (step S224). In the processing, the main CPU 41 pays out the coins in number determined based on the data (see FIGS. 18A to 18C) indicative of the relationship between the combination of symbols and the number of coin-outs.

Next, the main CPU 41 determines whether or not a specific symbol is rearranged (step S225). In the processing, the main CPU 41 determines whether or not any of the specific symbols including "blue7", "red7", "3bar", "2bar", and "1bar" is rearranged on the winning line WL.

When determining in step S225 that the specific symbol is not rearranged, the main CPU 41 shifts the processing to step S227. On the other hand, when determining in step S225 that the specific symbol is rearranged, the main CPU 41 transmits the specific-state information to the control device 200 (step S226). The specific-state information is Information indicative of the type and the number of the symbols rearranged on the winning line WL in step S222. The specific-state information corresponds to the common-game result information of the present invention.

Next, the main CPU 41 executes the processing of step S227 to step S228. The processing is the same as the processing of step S27 to step S28 in FIG. 10, and therefore, the description thereof is omitted here.

FIG. 21 is a view illustrating a number-of-points determination table according to another embodiment.

FIGS. 22A to 22C are views each illustrating exemplary symbols rearranged in display blocks in another embodiment.

As illustrated in FIG. 21, in the number-of-points determination table, symbols or the combination of symbols rearranged on the winning line WL and the numbers of points are set in association with each other. The number-of-points determination table data indicative of the number-of-points determination table (see FIG. 21) is stored in the hard disk drive 205 included in the control device 200.

In the present embodiment, the CPU 201 executes the following processing of step S122 in FIG. 13.

Namely, the CPU 201 determines the number of points based on the specific-state information received from the slot machine 10 in step S121 and the number-of-points determination table data (see FIG. 21) stored in the hard disk drive 205.

Further, in the present embodiment, the specific-state information received by the CPU 201 in step S121 is information indicative of the type and the number of the symbols rearranged on the winning line WL in step S222 in FIG. 10.

Hereinafter, examples of numbers of points determined by the CPU 201 in step S122 are listed.

For example, as illustrated in FIG. 22A, when a single "1bar" is rearranged on the winning line WL, the CPU 201 determines the number of points to be 10.

Further, as illustrated in FIG. 22B, when a single "1bar", a single "2bar", and a single "3bar" are rearranged on the winning line WL, the CPU 201 determines the number of points to be 60 (=10+20+30).

Further, as illustrated in FIG. 22C, when two "red7" and a single "blue7" are rearranged on the winning line WL, the CPU 201 determines the number of points to be 600 (=150×2+300).

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A gaming system comprising:

a plurality of gaming machines each including a controller;

a control device including a processor;

a network enabling communication between said plurality of gaming machines and said control device;

a reach portion indicative of a target position to reach; and a coupling illuminated line provided for each of said gaming machines and including a plurality of illuminants arranged from said reach portion to said gaming machine, wherein the coupling illuminated line is formed by a substantially straight portion extending from the reach portion to one of boundary plates and a bent portion extending from one of the boundary plates to the gaming machine, and the number of illuminants in the substantially straight portion is the same in each coupling illuminated line, whereas the number of illuminates in the bent portion of at least one of the coupling illuminated lines is different than the number of illuminants in the bent portion of other coupling illuminated lines, said controller is programmed to execute processing of (a) accepting a bet of a game medium, and (b) transmitting number-of-game-media information indicative of a number of betted game media as the bet accepted in said processing (a) to said control device, said processor is programmed to execute processing of (A) cumulatively counting a part of the number of betted game media as a cumulative value based on said number-of-game-media information received from said gaming machine, and (B) transmitting a common-game execution signal to said gaming machine, when said cumulative value has reached a predetermined value, said controller is further programmed to execute processing of (1) executing a common game without accepting the bet of the game medium in said processing (a), after receiving the common-game execution signal from said control device, and (2) transmitting common-game result information determined based on a result of the common game executed in said processing (1) to said control device, and said processor is further programmed to execute processing of (i) lighting said plurality of illuminants included in said coupling illuminated line provided for the gaming machine as a transmission source of the common-game result information, based on the common-game result information transmitted in said processing (d), in an order starting from said illuminant provided at a position closest to the gaming machine, wherein the corresponding relationship between the common-game result information at the substantially straight portion and the number of illuminants to be lighted is the same in each coupling illuminated line, and the corresponding relationship between the common-game result information at the bent portion and the number of illuminants to be lighted is capable of being varied in each coupling illuminated line, (ii) determining whether or not the coupling illuminated line with all of said illuminants having been lighted in said processing (i) is present, and (iii) paying out a predetermined number of game media, when determining that the coupling illuminated line with all of said illuminants having been lighted is present in said processing (ii), to said gaming machine provided with the coupling illuminated line.

2. The gaming system according to claim 1, wherein the corresponding relationship between the common-game result information and the number of illuminates to be lighted is defined by a number-of-lighting determination table for bent portions and a number-of-lighting determination table for straight portions.

3. The gaming system according to claim 1, wherein the number of illuminates to be lighted for a unit point in the common-game result information is larger in the substantially straight portion than in the bend portion.

4. A gaming system comprising:

a plurality of slot machines each including a symbol display capable of displaying a symbol, and a controller;

a control device including a processor;

a network enabling communication between said plurality of slot machines and said control device;

a reach portion indicative of a target position to reach; and a coupling illuminated line provided for each of said slot machines and including a plurality of illuminants arranged from said reach portion to said slot machine, wherein the coupling illuminated line is formed by a substantially straight portion extending from the reach portion to one of boundary plates and a bent portion extending from one of the boundary plates to the gaming machine, and the number of illuminants in the substantially straight portion is the same in each coupling illuminated line, whereas the number of illuminates in the bent portion of at least one of the coupling illuminated lines is different than the number of illuminants in the bent portion of other coupling illuminated lines, said controller is programmed to execute processing of (a) accepting a bet of a game medium, and (b) transmitting number-of-game-media information indicative of a number of betted game media as the bet accepted in said processing (a) to said control device, said processor is programmed to execute processing of (A) cumulatively counting a part of the number of betted game media as a cumulative value based on said number-of-game-media information received from said slot machine, and (B) transmitting a common-game execution signal to said slot machine, when said cumulative value has reached a predetermined value, said controller is further programmed to execute processing of (1) repeatedly executing processing of variably displaying said symbol and stop-displaying said symbol to said symbol display, without accepting the bet of the game medium in said processing (a), after receiving the common-game execution signal transmitted from said control device, and (2) transmitting common-game result information to said control device, and said processor is further programmed to execute processing of (i) determining a number of points to be offered to each of said slot machines based on a number or a combination of said symbol stop-displayed to said symbol display in each of said slot machines after executing said processing (B), (ii) lighting said plurality of illuminants included in said coupling illuminated line provided for the slot machine based on the number of points determined in said processing (i), the number of points being to be offered to the slot machine, in an order starting from said illuminant provided at a position closest to the slot machine, wherein the corresponding relationship between the common-game result information at the substantially straight portion and the number of illuminants to be lighted is the same in each coupling illuminated line, and the corresponding relationship between the common-game result information at the bent portion and the number of illuminants to be lighted is capable of being varied in each coupling illuminated line, (iii) determining whether or not the coupling illuminated line with all of said illuminants having been lighted in said processing (ii) is present, and (iv) paying out a predetermined number of game media, when determining that the coupling illuminated line with all of said illuminants having been lighted is present in said processing (iii), to said slot machine provided with the coupling illuminated line.

5. The gaming system according to claim 4, wherein said controller is further programmed to execute processing of (1) transmitting specific-state information at least indicative of a type of a specific state, when the number or the combination of said symbol stop-displayed to said symbol display is in the specific state out of a plurality of specific states, and the processing (i) executed by said processor is a processing of determining the number of points based on said specific-state information received from each of said slot machines, the number of points being varied in accordance with a type of the specific state indicated by said specific-state information.

6. The gaming system according to claim 4, wherein the number of said symbols is equal to or more than 1.

7. The gaming system according to claim 4, wherein the corresponding relationship between the common-game result information and the number of illuminates to be lighted is defined by a number-of-lighting determination table for bent portions and a number-of-lighting determination table for straight portions.

8. The gaming system according to claim 4, wherein the number of illuminates to be lighted for a unit point in the common-game result information is larger in the substantially straight portion than in the bend portion.

9. A gaming system comprising:

a plurality of slot machines each including a symbol display capable of displaying a symbol, and a controller;

a control device including a processor;

a network enabling communication between said plurality of slot machines and said control device;

a reach portion indicative of a target position to reach; and a coupling illuminated line provided for each of said slot machines and including a plurality of illuminants arranged from said reach portion to said slot machine, wherein the coupling illuminated line is formed by a substantially straight portion extending from the reach portion to one of boundary plates and a bent portion extending from one of the boundary plates to the gaming machine, and the number of illuminants in the substantially straight portion is the same in each coupling illuminated line, whereas the number of illuminates in the bent portion of at least one of the coupling illuminated lines is different than the number of illuminants in the bent portion of other coupling illuminated lines, said controller is programmed to execute processing of (a) accepting a bet of a game medium, and (b) transmitting number-of-game-media information indicative of a number of betted game media as the bet accepted in said processing (a) to said control device, said processor is programmed to execute processing of (A) cumulatively counting a part of the number of betted game media as a cumulative value based on said number-of-game-media information received from said slot machine, and (B) transmitting a common-game execution signal to said slot machine, when said cumulative value has reached a predetermined value, said controller is further programmed to execute processing of (1) repeatedly executing processing of variably displaying said symbol and stop-displaying said symbol to said symbol display, without accepting the bet of the game medium in said processing (a), after receiving the common-game execution signal from said control device, and (2) transmitting common-game result information to said control device, and said processor is further programmed to execute processing of (i) determining a number of points to be offered to each of said slot machines based on a number or a combination of said symbol stop-displayed to said symbol display in each of said slot machines after executing said processing (B), (ii) cumulatively counting the number of points determined in said processing (i) for each slot machine as a number of accumulated points, (iii) lighting a plurality of illuminants included in said coupling illuminated line provided for the slot machine based on the number of accumulated points counted in said processing (ii), the slot machine being associated with the number of accumulated points, in an order starting from said illuminant provided at a position closest to the slot machine, wherein the corresponding relationship between the common-game result information at the substantially straight portion and the number of illuminants to be lighted is the same in each coupling illuminated line, and the corresponding relationship between the common-game result information at the bent portion and the number of illuminants to be lighted is capable of being varied in each coupling illuminated line, (iv) determining whether or not the coupling illuminated line with all of said illuminants having been lighted in said processing (iii) is present, and (v) paying out a predetermined number of game media, when determining that the coupling illuminated line with all of said illuminants having been lighted is present in said processing (iv), to said slot machine provided with the coupling illuminated line.

10. The gaming system according to claim 9, wherein the number of said symbols is equal to or more than 1.

11. The gaming system according to claim 9, wherein the corresponding relationship between the common-game result information and the number of illuminates to be lighted is defined by a number-of-lighting determination table for bent portions and a number-of-lighting determination table for straight portions.

12. The gaming system according to claim 9, wherein the number of illuminates to be lighted for a unit point in the common-game result information is larger in the substantially straight portion than in the bend portion.

13. A game control method comprising steps of:

(a) accepting a bet of a game medium in a gaming machine;

(b) transmitting number-of-game-media information indicative of a number of betted game media as the bet accepted in said step (a) to a control device from said gaming machine;

(c) cumulatively counting a part of the number of betted game media in said control device as a cumulative value based on said number-of-game-media information received from said slot machine;

(d) transmitting a common-game execution signal to said gaming machine from said control device, when said cumulative value has reached a predetermined value;

(e) executing a common game in said gaming machine without accepting the bet of the game medium in said step (a) after receiving the common-game execution signal transmitted from said control device;

(f) transmitting common-game result information determined based on a result of the common game executed in said step (e) to said control device from said gaming machine;

(g) lighting by using said control device a plurality of illuminants included in a coupling illuminated line provided for the gamine machine as a transmission source of the common-game result information based on the common-game result information transmitted in said step (f), in an order starting from said illuminant provided at a position closest to the gaming machine, said coupling illuminated line being provided for each of said gaming machines and including said plurality of illuminants arranged from a reach portion indicative of a target position to reach to said gaming machine, wherein the coupling illuminated line is formed by a substantially straight portion extending from the reach portion to one of boundary plates and a bent portion extending from one of the boundary plates to the gaming machine, and the number of illuminants in the substantially straight portion is the same in each coupling illuminated line, whereas the number of illuminates in the bent portion of at least one of the coupling illuminated lines is different than the number of illuminants in the bent portion of other coupling illuminated lines, and wherein the corresponding relationship between the common-game result information at the substantially straight portion and the number of illuminants to be lighted is the same in each coupling illuminated line, and the corresponding relationship between the common-game result information at the bent portion and the number of illuminants to be lighted is capable of being varied in each coupling illuminated line;

(h) determining in said control device whether or not the coupling illuminated line with all of said illuminants having been lighted in said step (g) is present; and (i) paying out a predetermined number of game media, when determining that the coupling illuminated line with all of said illuminants having been lighted is present in said step (h), from said control device to said gaming machine provided with the coupling illuminated line.

14. The game control method according to claim 13, wherein the corresponding relationship between the common-game result information and the number of illuminates to be lighted is defined by a number-of-lighting determination table for bent portions and a number-of-lighting determination table for straight portions.

15. The game control method according to claim 13, wherein the number of illuminates to be lighted for a unit point in the common-game result information is larger in the substantially straight portion than in the bend portion.

16. A game control method comprising steps of:

(a) accepting a bet of a game medium in a slot machine;

(b) transmitting number-of-game-media information indicative of a number of betted game media as the bet accepted in said step (a) to a control device from said slot machine;

(c) cumulatively counting in said control device a part of the number of betted game media as a cumulative value based on said number-of-game-media information received from said slot machine;

(d) transmitting a common-game execution signal to said slot machine from said control device, when said cumulative value has reached a predetermined value;

(e) repeatedly executing processing of variably displaying a symbol and stop-displaying said symbol to a symbol display capable of variably displaying said symbol in said slot machine, without accepting the bet of the game medium in said step (a), after receiving the common-game execution signal transmitted from said control device;

(f) transmitting common-game result information to said control device, and (g) determining a number of points to be offered to each of said slot machines by using said control device based on a number or a combination of said symbol stop-displayed to said symbol display in each of said slot machines after executing said step (d);

(h) lighting by using said control device a plurality of illuminants included in a coupling illuminated line provided for the slot machine based on the number of points determined in said step (g), the number of points being to be offered to the slot machine, in an order starting from said illuminant provided at a position closest to the slot machine, said coupling illuminated line being provided for each of said slot machines and including said plurality of illuminants arranged from said reach portion to said slot machine, wherein the coupling illuminated line is formed by a substantially straight portion extending from the reach portion to one of boundary plates and a bent portion extending from one of the boundary plates to the gaming machine, and the number of illuminants in the substantially straight portion is the same in each coupling illuminated line, whereas the number of illuminates in the bent portion of at least one of the coupling illuminated lines is different than the number of illuminants in the bent portion of other coupling illuminated lines, and wherein the corresponding relationship between the common-game result information at the substantially straight portion and the number of illuminants to be lighted is the same in each coupling illuminated line, and the corresponding relationship between the common-game result information at the bent portion and the number of illuminants to be lighted is capable of being varied in each coupling illuminated line;

(i) determining in said control device whether or not the coupling illuminated line with all of said illuminants having been lighted in said step (h) is present; and (j) paying out a predetermined number of game media, when determining that the coupling illuminated line with all of said illuminants having been lighted is present in said step (i), from said control device to said slot machine provided with the coupling illuminated line.

17. The game control method according to claim 16, wherein the corresponding relationship between the common-game result information and the number of illuminates to be lighted is defined by a number-of-lighting determination table for bent portions and a number-of-lighting determination table for straight portions.

18. The game control method according to claim 16, wherein the number of illuminates to be lighted for a unit point in the common-game result information is larger in the substantially straight portion than in the bend portion.

19. A game control method comprising steps of:

(a) accepting a bet of a game medium in a slot machine;

(b) transmitting number-of-game-media information indicative of a number of betted game media as the bet accepted in said step (a) to a control device from said slot machine;

(c) cumulatively counting in said control device a part of the number of betted game media as a cumulative value based on said number-of-game-media information received from said slot machine;

(d) transmitting a common-game execution signal to said slot machine from said control device, when said cumulative value has reached a predetermined value;

(e) repeatedly executing processing of variably displaying a symbol and stop-displaying said symbol to a symbol display capable of variably displaying said symbol in said slot machine, without accepting the bet of the game medium in said step (a), after receiving the common-game execution signal transmitted from said control device;

(f) transmitting common-game result information to said control device, and (g) determining a number of points to be offered to each of said slot machines by using said control device based on a number or a combination of said symbol stop-displayed to said symbol display in each of said slot machines after executing said step (d);

(h) cumulatively counting in said control device the number of points determined in said step (g) for each slot machine as a number of accumulated points;

(i) lighting by using said control device a plurality of illuminants included in a coupling illuminated line provided for the slot machine based on the number of accumulated points counted in said step (h), the slot machine being associated with the number of accumulated points, in an order starting from said illuminant provided at a position closest to the slot machine, said coupling illuminated line being provided for each of said slot machines and including said plurality of illuminants arranged from a reach portion indicative of a target position to reach to said slot machine, wherein the coupling illuminated line is formed by a substantially straight portion extending from the reach portion to one of boundary plates and a bent portion extending from one of the boundary plates to the gaming machine, and the number of illuminants in the substantially straight portion is the same in each coupling illuminated line, whereas the number of illuminates in the bent portion of at least one of the coupling illuminated lines is different than the number of illuminants in the bent portion of other coupling illuminated lines, and wherein the corresponding relationship between the common-game result information at the substantially straight portion and the number of illuminants to be lighted is the same in each coupling illuminated line, and the corresponding relationship between the common-game result information at the bent portion and the number of illuminants to be lighted is capable of being varied in each coupling illuminated line;

(j) determining in said control device whether or not the coupling illuminated line with all of said illuminants having been lighted in said step (i) is present; and (k) paying out a predetermined number of game media, when determining that the coupling illuminated line with all of said illuminants having been lighted is present in said step (j), from said control device to said slot machine provided with the coupling illuminated line.

20. The game control method according to claim 19, wherein the corresponding relationship between the common-game result information and the number of illuminates to be lighted is defined by a number-of-lighting determination table for bent portions and a number-of-lighting determination table for straight portions.

21. The game control method according to claim 19, wherein the number of illuminates to be lighted for a unit point in the common-game result information is larger in the substantially straight portion than in the bend portion.

* * * * *